(12) United States Patent
Braedt

(10) Patent No.: US 11,661,142 B2
(45) Date of Patent: May 30, 2023

(54) REAR GEARSHIFT MECHANISM FOR COAXIAL INSTALLATION

(71) Applicant: SRAM DEUTSCHLAND GmbH, Schweinfurt (DE)

(72) Inventor: Henrik Braedt, Hambach (DE)

(73) Assignee: SRAM DEUTSCHLAND GmbH, Schweinfurt (DE)

(*) Notice: Subject to any disclaimer, the term of this patent is extended or adjusted under 35 U.S.C. 154(b) by 143 days.

(21) Appl. No.: 16/950,282

(22) Filed: Nov. 17, 2020

(65) Prior Publication Data

US 2021/0070395 A1 Mar. 11, 2021

Related U.S. Application Data

(63) Continuation of application No. 15/926,194, filed on Mar. 20, 2018, now Pat. No. 10,870,464.

(30) Foreign Application Priority Data

Mar. 20, 2017 (DE) ..................... 10 2017 002 629.7
Feb. 16, 2018 (DE) ..................... 10 2018 001 253.1

(51) Int. Cl.
| | |
|---|---|
| *B62M 9/125* | (2010.01) |
| *B62M 9/1242* | (2010.01) |
| *B62M 9/128* | (2010.01) |
| *B62M 9/127* | (2010.01) |
| *B62M 9/126* | (2010.01) |
| *B62K 25/02* | (2006.01) |
| *B62M 9/16* | (2006.01) |

(52) U.S. Cl.
CPC ............ *B62M 9/125* (2013.01); *B62K 25/02* (2013.01); *B62M 9/126* (2013.01); *B62M 9/127* (2013.01); *B62M 9/128* (2013.01); *B62M 9/1242* (2013.01); *B62M 9/16* (2013.01)

(58) Field of Classification Search
CPC ...... B62M 9/125; B62M 9/122; B62M 9/121; B62M 9/1244; B62M 9/1242; B62K 25/02
USPC ...................................... 474/80, 82
See application file for complete search history.

(56) References Cited

U.S. PATENT DOCUMENTS

| | | | | |
|---|---|---|---|---|
| 3,111,855 A | * | 11/1963 | Juy ................ | B62M 9/126 474/82 |
| 3,903,751 A | * | 9/1975 | Dian ................ | B62M 9/1244 474/82 |
| 3,927,904 A | * | 12/1975 | Bergles ............ | B62M 9/1242 474/82 |
| 3,979,962 A | * | 9/1976 | Kebsch ............ | B62M 9/1242 474/82 |
| 4,061,048 A | * | 12/1977 | Huret .............. | B62M 9/126 474/82 |

(Continued)

FOREIGN PATENT DOCUMENTS

| | | |
|---|---|---|
| DE | 60309274 T2 | 8/2007 |
| DE | 102014223024 A1 | 5/2015 |

*Primary Examiner* — Henry Y Liu

(57) ABSTRACT

A bicycle gearshift mechanism has a base element, a pivot mechanism, a movable element, and a chain guide arrangement. The pivot mechanism connects the base element to the movable element. The chain guide arrangement is connected, rotatably about a rotary axle, to the movable element. The base element comprises a first attachment end, which is coaxial with respect to the rear-wheel axle or axis, and a second attachment end for coupling to the pivot mechanism.

12 Claims, 24 Drawing Sheets

(56) References Cited

U.S. PATENT DOCUMENTS

| | | | | |
|---|---|---|---|---|
| 4,185,510 A * | 1/1980 | Juy | B62M 9/1244 | 280/238 |
| 4,504,250 A * | 3/1985 | Juy | B62M 9/1244 | 474/78 |
| 4,734,084 A * | 3/1988 | Nagano | B62M 9/125 | 474/82 |
| 4,789,379 A * | 12/1988 | Ozaki | B62M 9/1248 | 474/82 |
| 4,842,568 A * | 6/1989 | Marchigiano | B62M 9/125 | 474/80 |
| 5,397,273 A * | 3/1995 | Ando | B62M 9/1248 | 474/82 |
| 5,494,307 A * | 2/1996 | Anderson | B62M 9/122 | 280/236 |
| 5,518,456 A * | 5/1996 | Kojima | B62M 9/1248 | 474/82 |
| 5,597,366 A * | 1/1997 | Ozaki | B62M 9/1248 | 474/82 |
| 5,624,335 A * | 4/1997 | Ando | B62M 9/1244 | 474/80 |
| 5,919,106 A * | 7/1999 | Ichida | B62M 9/125 | 474/82 |
| 5,961,409 A * | 10/1999 | Ando | B62M 9/1244 | 474/82 |
| 6,162,140 A * | 12/2000 | Fukuda | B62M 25/08 | 474/81 |
| 6,293,883 B1 * | 9/2001 | Ichida | B62K 25/02 | 474/82 |
| 6,761,655 B2 * | 7/2004 | Fukuda | B62M 9/128 | 474/70 |
| 7,033,294 B2 * | 4/2006 | Chamberlain | B62J 13/00 | 474/80 |
| 7,044,874 B2 * | 5/2006 | Shahana | B62M 9/125 | 474/82 |
| 7,048,660 B2 * | 5/2006 | Shahana | B62M 9/125 | 474/80 |
| 7,125,354 B2 * | 10/2006 | Shahana | B62M 9/1242 | 474/82 |
| 7,152,498 B2 * | 12/2006 | Shahana | F16C 1/12 | 74/502.6 |
| 7,396,304 B2 * | 7/2008 | Shahana | B62M 9/125 | 474/82 |
| 7,703,785 B2 * | 4/2010 | Colegrove | B62K 25/286 | 474/122 |
| 8,419,573 B2 * | 4/2013 | Yamaguchi | B62M 9/127 | 267/155 |
| 9,676,444 B2 * | 6/2017 | Shipman | B62M 25/08 | |
| 10,011,325 B2 * | 7/2018 | Zawistowski | B62M 9/122 | |
| 10,793,222 B1 * | 10/2020 | Harris | B62M 9/1244 | |
| 2004/0106482 A1 * | 6/2004 | Nagano | B62M 9/1242 | 474/82 |
| 2004/0110586 A1 * | 6/2004 | Shahana | B62J 23/00 | 474/80 |
| 2004/0116222 A1 * | 6/2004 | Shahana | B62M 9/125 | 474/82 |
| 2004/0177713 A1 * | 9/2004 | Shahana | B62M 9/125 | 74/473.14 |
| 2004/0254038 A1 * | 12/2004 | Chamberlain | B62M 9/128 | 474/82 |
| 2005/0192138 A1 * | 9/2005 | Sze | B62M 9/126 | 474/83 |
| 2005/0215368 A1 * | 9/2005 | Hoe | B62M 9/126 | 474/80 |
| 2006/0172831 A1 * | 8/2006 | Wen | B62M 9/128 | 474/82 |
| 2007/0021248 A1 * | 1/2007 | Shahana | B62M 9/16 | 474/83 |
| 2007/0026985 A1 * | 2/2007 | Yamaguchi | B62M 9/126 | 474/82 |
| 2009/0045601 A1 * | 2/2009 | Colegrove | B62M 9/125 | 280/284 |
| 2010/0160099 A1 * | 6/2010 | Colegrove | B62M 9/125 | 474/122 |
| 2015/0111675 A1 | 4/2015 | Shipman et al. | | |
| 2016/0039494 A1 * | 2/2016 | Mikesell | B62K 3/02 | 474/82 |
| 2016/0167740 A1 * | 6/2016 | Zawistowski | B62M 9/1342 | 474/122 |
| 2018/0022417 A1 * | 1/2018 | Bernardele | B62M 9/1244 | 474/122 |
| 2018/0065708 A1 * | 3/2018 | Shipman | B62M 9/122 | |
| 2018/0237104 A1 * | 8/2018 | Pasqua | B62M 9/125 | |
| 2018/0265169 A1 * | 9/2018 | Braedt | B62M 9/125 | |
| 2018/0354586 A1 * | 12/2018 | Komatsu | B62M 9/1242 | |
| 2019/0144071 A1 * | 5/2019 | Boehm | B62M 9/1242 | 474/80 |
| 2019/0351971 A1 * | 11/2019 | Dueweling | B62M 9/122 | |

\* cited by examiner

REAR GEARSHIFT MECHANISM FOR COAXIAL INSTALLATION

This application claims priority to, and/or the benefit of, U.S. patent application Ser. No. 15/926,194, filed Mar. 20, 2018, which claims priority to, and/or the benefit of, German patent application DE 10 2017 002 629.7, filed on Mar. 20, 2017, and German patent application DE 10 2018 001 253.1, filed on Feb. 16, 2018, the disclosure of which are all included by reference herein in their entirety.

FIELD OF THE INVENTION

The invention relates to a bicycle gearshift mechanism, and more particularly to a bicycle rear gearshift mechanism for coaxial installation on a rear-wheel axis.

BACKGROUND

Rear gearshift mechanisms are traditionally fastened to the right-hand dropout of the frame by means of a derailleur hanger. For this purpose, the derailleur hanger is, at one end thereof, fixed to the frame coaxially with respect to the rear-wheel axis and, at the other end thereof, connected to the base element (also referred to as B-knuckle) of the gearshift mechanism. The base element is rotatable relative to the derailleur hanger about the B-axle. Derailleur hangers differ from one another greatly depending on manufacturer and manner of attachment. They may be formed in one piece with the frame or may be present as a separate component. Separate derailleur hangers are clamped to the frame either by means of quick-release axles or by means of thru axles. The clamping is possible both on the frame outer side and on the frame inner side. This has the effect that, depending on the derailleur hanger used, the gearshift mechanism assumes a different position relative to the rear-wheel axis and also relative to the sprocket assembly. These differences in position in the axial direction and in the radial direction complicate the design of the gearshift mechanism and the installation thereof. The gearshift mechanism must be newly set depending on the derailleur hanger. Owing to the additional component, additional tolerances are involved, which have an adverse effect on the positioning accuracy of the gearshift mechanism.

Furthermore, the derailleur hangers, specifically as separate components, are susceptible to damage and are often unstable. In the case of large sprocket assemblies and correspondingly large gearshift mechanism dimensions, increased lever forces occur, which can often be only inadequately accommodated by an exchangeable derailleur hanger. Furthermore, the enlarged gearshift mechanism dimensions with the lengthened lever ratios additionally have an adverse effect on the positioning accuracy of the gearshift mechanism. Conflicting with this is the fact that an increased number of sprockets arranged closely adjacent to one another specifically demands increased positioning accuracy.

The rear wheel comprises inter alia a rear-wheel hub with a hollow hub axle (also referred to as hollow axle). For the fastening of the rear wheel to the frame, a separate thru axle or quick-release axle is led through the hub axle of the rear-wheel hub and is clamped to the frame.

The problems discussed are addressed in part by already known gearshift mechanisms. For example, EP 0 875 444 A1, EP 1 342 658 A1 and EP 1 764 297 A1 describe gearshift mechanisms in which the separate derailleur hanger is omitted. The rotary axle of the base element runs along the rear-wheel axis, that is to say is coaxial with respect to the latter.

Normally, the known gearshift mechanisms comprise a base element with a fastening end with an opening for receiving an axle. The fastening end is, similarly to a derailleur hanger, fastened to the frame either on the outside or on the inside. For this purpose, said fastening end is clamped to the frame in non-positively locking fashion by means of a thru axle or quick-release axle. These known coaxial designs however often have deficiencies.

One such deficiency is the lack of stability of the arrangement. Modern sprocket assemblies comprise an ever increasing number of 11 or more sprockets. To be able to operate these using the gearshift mechanism, the gearshift mechanism dimension is increased. The lever forces acting on the gearshift mechanism also increase in association with this, such that the gearshift mechanism exhibits a tendency to tilt relative to the planes of rotation of the sprockets. Only a gearshift mechanism standing exactly vertically under the sprocket assembly permits precise gearshifts.

A further such deficiency is the dependency of frame tolerances. Since conventional gearshift mechanisms are fastened directly to the frame and are referenced with respect to the latter, manufacturing tolerances of the frame also have a direct effect on the gearshift mechanism. The positioning accuracy and settability of the gearshift mechanism suffer as a result.

Furthermore, the known axially installed gearshift mechanisms are susceptible to incorrect gearshifts. Owing to their obliquely positioned linkage mechanism (oblique parallelogram), shocks in a vertical direction, such as a rise during off-road riding, can lead to a movement of the linkage mechanism and thus to undesired gearshift processes (ghost shifting). Specifically for use with large cassette spreads, oblique parallelograms exhibit only limited suitability. To be able to reach the sprockets that exhibit great differences in size, the oblique parallelogram would have to be set to an even more oblique position, and/or the gearshift mechanism dimensions would have to be increased further. Both would further increase the susceptibility to undesired gearshift processes. An additional problem of gearshift mechanisms with oblique parallelograms is that they can be set only in a complicated manner.

The problem addressed is therefore that of providing a rear gearshift mechanism which overcomes the disadvantages of the known gearshift mechanisms.

SUMMARY AND DESCRIPTION

In an embodiment, a rear gear shifting mechanism for a bicycle includes a base element, a linkage mechanism, a movable element, and a chain guide arrangement. In the embodiment the linkage mechanism connects the base element to the movable element, and the chain guide arrangement is connected, rotatably about a rotary axle axis, to the movable element. In this embodiment the base element comprises a first attachment end for coaxial installation on the rear-wheel axle axis and a second attachment end for coupling to the linkage mechanism.

In an embodiment the rear gear shifting mechanism is configured such that the first attachment end has a first arm and a second arm, which are arranged so as to be spaced apart from one another in an axial direction.

In an embodiment, the rear gear shifting mechanism is configured such that the base element, in particular the hub stop surface of the first arm, abuts in an operationally ready state axially against a hub end cap.

In an embodiment, the rear gear shifting mechanism is configured such that the linkage mechanism comprises at least one pivot axle which is oriented orthogonally with respect to the rear-wheel axis.

BRIEF DESCRIPTION OF THE DRAWING

The present invention is explained in greater detail below with reference to the appended drawings, in which:

FIG. 15b shows a perspective view from the outside of FIG. 15a;

FIG. 20b shows a sectional illustration of the thru axle from FIG. 20a;

FIG. 24b shows a perspective view from the outside of FIG. 24a;

FIG. 25b shows a sectional illustration of the thru axle from FIG. 25a.

DETAILED DESCRIPTION OF THE DRAWING

Figure 1:
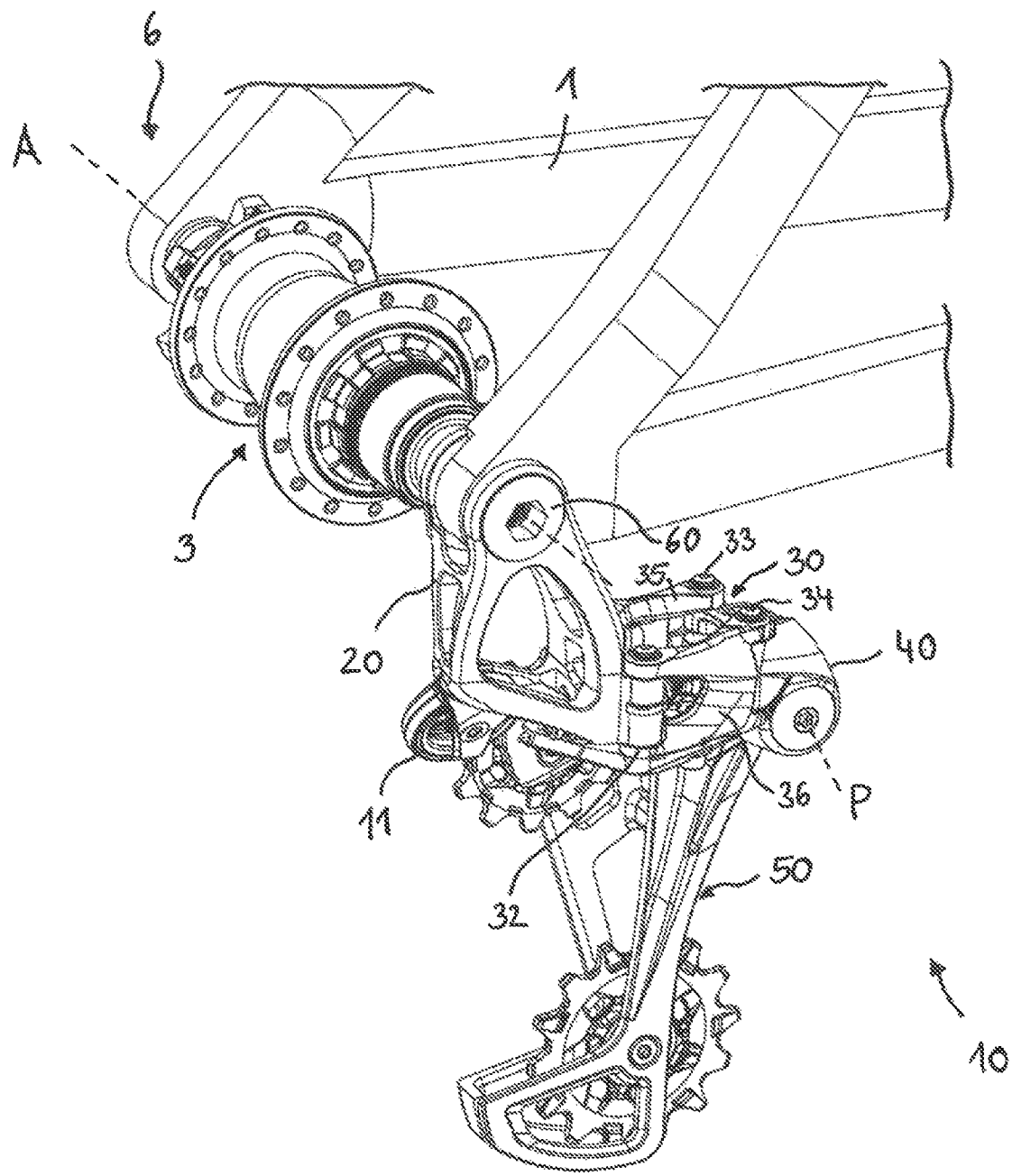
FIG. 1 shows a perspective view of the outer side of a gearshift mechanism.

A first aspect of the invention achieves the object by a rear gearshift mechanism, such as a rear derailleur, for coaxial installation on a rear wheel axle and/or axis of a bicycle. In an embodiment, the rear gear shifting mechanism for a bicycle includes a base element, a linkage mechanism, a movable element, and a chain guide arrangement. In the embodiment the linkage mechanism connects the base element to the movable element, and the chain guide arrangement is connected, rotatably about a rotary axle axis, to the movable element. In this embodiment the base element comprises a first attachment end for coaxial installation on the rear-wheel axle axis and a second attachment end for coupling to the linkage mechanism. In this embodiment, the rear gear shifting mechanism is configured such that the first attachment end has a first arm and a second arm, which are arranged so as to be spaced apart from one another in an axial direction.

The rear gearshift mechanism according to the invention is suitable for coaxial installation on a rear-wheel axis. The gearshift mechanism has a base element (also referred to as B-knuckle), a linkage mechanism, a movable element (also referred to as P-knuckle) and a chain guard arrangement. The linkage mechanism connects the base element to the movable element. The chain guard arrangement is connected, rotatably about a rotary axle (P-axle), to the movable element. The base element comprises a first attachment end, which can be installed on the bicycle frame coaxially with respect to the rear-wheel axis, and a second attachment end for coupling to the linkage mechanism. Here, the first attachment end has a first arm and a second arm which are arranged spaced apart from one another in an axial direction.

The two arms serve for the fastening of the base element to the rear-wheel axle arrangement. An advantage in this embodiment is that the two mutually spaced-apart arms of the base element ensure a stable orientation of the gearshift mechanism parallel to the plane of rotation of the sprockets, and thus perpendicular to the rear-wheel axis, in the installed state of the gearshift mechanism. Tilting of the gearshift mechanism out of said plane is prevented in an effective manner even under the action of relatively high forces. The two axially spaced-apart fastening points of the base element to the rear-wheel axle assembly can accommodate the forces acting on the gearshift mechanism much more effectively than the known gearshift mechanisms with only one fastening end.

In one refinement of the gearshift mechanism, in the installed state of the gearshift mechanism, the first arm is situated on an axial inner side of a bicycle frame and the second arm is situated on an axial outer side of the frame. In other words, this means that the rear gearshift mechanism is mounted on the frame coaxially with respect to the rear-wheel axis A. More specifically, the gearshift mechanism is installed on the right-hand dropout of the frame.

The inner side of the frame refers to that side of the frame which points in the direction of the sprocket assembly. The axial outer side refers to that side of the frame which is situated opposite the inner side and which points away from the sprocket assembly.

In one refinement of the gearshift mechanism, the first arm has a first centering opening and the second arm has a second centering opening.

In one refinement of the gearshift mechanism, the first arm has, on its axial outer side, an adapter stop surface.

In one refinement of the gearshift mechanism, the first arm has, on its axial inner side, a hub stop surface.

The two stop surfaces provide in each case one axial stop for the parts that adjoin the base element in the installed state. In the embodiment, an adapter bears against the base element from the outside, and a hub, in particular a hub end cap, bears against the base element from the inside.

In one refinement of the gearshift mechanism, the first arm has, on its axial inner side, a hub guide.

The hub guide facilitates the installation of the rear wheel, because the hub, in particular the hub end cap, can slide into its end position along the hub guide, in particular along the guide surfaces thereof which taper towards one another. The inner side of the arm refers in turn to that side of the arm which points in the direction of the sprocket assembly in the installed state of the base element. The outer side refers to that side of the arm which points away from the sprocket assembly.

In one refinement of the gearshift mechanism, the first arm has an axle opening for the leadthrough of an axle. The axle is in particular a thru axle or a quick-release axle. The diameter of the axle opening must thus be dimensioned to be larger than that of the axle in order that the latter can be led through. In the present case, the centering opening on the first arm simultaneously forms the axle opening. The two openings could however also be formed separately from one another.

The second arm, mounted on the outer side of the frame, of the base element may also have an axle opening, if the axle projects into the region of the second arm or beyond. This may apply in the case of quick-release axles. In one refinement of the gearshift mechanism, the base element has an attachment point for a cable diverter or pulley. Normally, a gearshift cable extending from the frame is led to the gearshift mechanism via the gearshift diverter.

In one refinement of the gearshift mechanism, the base element has a first receptacle for a first pivot axle of the linkage mechanism and a second receptacle for a second pivot axle of the linkage mechanism. The inner pivot arm of the linkage mechanism is rotatably connected to the base element by the first pivot axle. The outer pivot arm of the linkage mechanism is rotatably connected to the base element by the second pivot axle. For this purpose, the pivot axles are mounted in in each case one receptacle on the base element. The axle receptacles are oriented such that they can receive pivot axles oriented orthogonally with respect to the rear-wheel axis. That is to say, the receptacles or the longitudinal axes thereof are coordinated with the pivot axles of the linkage mechanism and are each oriented, exactly like the pivot axles, orthogonally with respect to the rear-wheel axis. An orientation orthogonal with respect to the rear-wheel axis construction that the longitudinal axes of the first and second receptacles of the base element each lie in a plane which intersects the rear-wheel axis, or a geometric axis A running along the rear-wheel axis, at a right angle. Small deviations owing to the normal manufacturing tolerances are self-evidently possible. This orientation of the receptacles on the base element permits the coupling to a straight linkage mechanism (straight four-joint parallelogram). The attachment parts for the cable diverter may either be formed in one piece with the base element or may be connected as a separate part to said base element. The same applies to the inner and outer axle receptacles.

The base element itself may also be of single-part or multi-part form. A single-piece base element manufactured from metal, in particular milled from aluminum, is particularly stable and can be manufactured with high precision. Other materials such as fiber-reinforced plastics may however also be used for parts or for the entire base element.

In one refinement, the gearshift mechanism has an adapter which comprises a screw connection. The screw connection is formed in particular by a bolt with an external thread and a nut with an internal thread. The gearshift mechanism is fixable to the frame by use of the adapter.

The adapter is insertable into a frame opening. In other words, the adapter extends through the frame opening. The frame opening may differ depending on the axle used. Thru axles are normally inserted into openings that are enclosed by the frame. Quick-release axles are, by contrast, normally inserted from below into a slot-like opening.

The adapter is fixable on the frame using the screw connection. For this purpose, the adapter has, at its ends thereof, external diameters which are dimensioned to be larger than the diameter of the frame opening. One end of the adapter lies against the inner side of the frame and the other end lies against the outer side. By tightening the screw connection, the adapter is fixable relative to the frame both in an axial direction and in rotation. The bolt head of the bolt and the nut are dimensioned to be larger than the frame opening and bare against the inner side and outer side thereof. The nut has a knurled contact surface which, in the fully installed state, bears in non-positively locking and positively locking fashion against the frame.

In one refinement of the gearshift mechanism, the bolt has a bolt body with a contact region and a compensation region. The contact region bears against the internal diameter of the frame opening. The compensation region tapers for example in a conical manner and exhibits a slightly greater amount of play relative to the frame opening. Owing to the increased play, the bolt and thus the adapter as a whole can be aligned relative to the frame opening. Frame inaccuracies can thus be compensated. The adapter can be aligned coaxially with the rear-wheel axis A even if the frame opening axis deviates therefrom owing to tolerances.

In one refinement of the gearshift mechanism, the adapter has an axle opening in which an internal thread is arranged. The counterpart thread of a thru axle can be screwed into the internal thread. In particular, the bolt has the axle opening with the internal thread.

The external thread of the bolt and the internal thread of the bolt are arranged in regions along the bolt longitudinal axis which do not overlap or overlap only slightly. The forces transmitted to the bolt by the thread can be accommodated most effectively with this arrangement.

In one refinement of the gearshift mechanism, a first external diameter of the adapter is coordinated with an internal diameter of the first centering opening of the base element, and a second external diameter of the adapter is coordinated with an internal diameter of the second centering opening of the base element.

In particular, the first external diameter of a centering foot of the bolt is coordinated with the first centering opening. A second external diameter of the bolt head is coordinated with the second centering opening.

A clearance fit between the adapter and the centering openings of the base element makes it possible for the adapter to be inserted into the base element and thus for the base element to be centered relative to the adapter.

In one refinement of the gearshift mechanism, the adapter, in particular the stop surface of the bolt, bears in the installed state against the adapter stop surface of the base element. An axial movement of the adapter relative to the base element in an inwards direction is thereby limited.

In one refinement of the gearshift mechanism, the base element has a stop and the adapter has a counterpart stop. If the adapter is rotated clockwise, it strikes with its counterpart stop against the stop of the base element and rotates the latter conjointly. The rotation of the adapter relative to the base element is limited by the stops. The stop on the base element is formed in particular by two pins on the first arm of the base element, which interact with two projections on the nut.

A second aspect of the invention achieves the object using a rear gearshift mechanism for coaxial installation. In an embodiment, a rear gear shifting mechanism for a bicycle includes a base element, a linkage mechanism, a movable element, and a chain guide arrangement. In the embodiment the linkage mechanism connects the base element to the movable element, and the chain guide arrangement is connected, rotatably about a rotary axle axis, to the movable element. In this embodiment the base element comprises a first attachment end for coaxial installation on the rear-wheel axle axis and a second attachment end for coupling to the linkage mechanism. In an embodiment, the rear gear shifting mechanism is configured such that the base element, in particular the hub stop surface of the first arm, abuts in an operationally ready state axially against a hub end cap.

According to the second aspect of the invention, the rear gearshift mechanism according to the invention is suitable for coaxial installation on a rear-wheel axle. The gearshift mechanism has a base element, a linkage mechanism, a movable element and a chain guide arrangement. The linkage mechanism connects the base element to the movable element. The chain guide element is connected, rotatably about a rotary axle P, to the movable element. The base element abuts in an operationally ready state axially against a hub end cap. In particular, the hub stop surface of the first arm of the base element is supported on the hub end cap.

The gearshift mechanism is thus referenced with respect to the hub in an axial direction.

In one refinement of the gearshift mechanism, the first arm of the base element is in an operationally ready state arranged between the hub end cap and the adapter. In particular, the first arm of the base element is fixed in non-positively locking and rotationally fixed fashion between the hub end cap and the adapter.

The non-positive locking is generated by tightening an axle, in particular the thru axle. Here, the base element is clamped between the hub end cap and the adapter and is at the same time oriented orthogonally with respect to the hub axle. The conventional referencing of the gearshift mechanism with respect to the frame is omitted, such that manufacturing tolerances of the frame no longer have an adverse effect on the positioning and setting of the gearshift mechanism. The base element is ideally positioned with a degree of play with respect to the frame, such that it does not quite make contact with the latter.

In the operationally ready state, the gearshift mechanism and the rear wheel are installed, and the thru axle is tightened. The base element is then both fixed in an axial direction and installed rotationally conjointly on the rear-wheel axle arrangement. Furthermore, the base element engages around the adapter and is centered relative to the latter.

As an alternative to the hub end cap, it is also possible in the case of other hub constructions for an axle nut or some other similar functional part to abut against the base element. It is important that said functional part permits perpendicular orientation of the base element and thus of the gearshift mechanism relative to the rear-wheel axis A.

A third aspect of the invention achieves the object using a rear gearshift mechanism for coaxial installation. In an embodiment, a rear gear shifting mechanism for a bicycle includes a base element, a linkage mechanism, a movable element, and a chain guide arrangement. In the embodiment the linkage mechanism connects the base element to the movable element, and the chain guide arrangement is connected, rotatably about a rotary axle axis, to the movable element. In this embodiment the base element comprises a first attachment end for coaxial installation on the rear-wheel axle axis and a second attachment end for coupling to the linkage mechanism. In an embodiment, the rear gear shifting mechanism is configured such that the linkage mechanism comprises at least one pivot axle which is oriented orthogonally with respect to the rear-wheel axis.

According to the third aspect of the invention, the rear gearshift mechanism according to the invention is suitable for coaxial installation on a rear-wheel axis. The gearshift mechanism has a base element, a linkage mechanism, a movable element and a chain guide arrangement. The linkage mechanism connects the base element to the movable element. The chain guide element is connected, rotatably about a rotary axle P, to the movable element. The linkage mechanism comprises at least one pivot axle which is oriented orthogonally with respect to the rear-wheel axis A. The orthogonal orientation of the pivot axle is in this case independent of the selected relative position of the gearshift mechanism.

That is to say, the pivot axle lies in a plane that intersects the rear-wheel axle, or a geometric axis A running along the rear-wheel axle, at a right angle. Owing to manufacturing tolerances and installation inaccuracies, said angle may also deviate slightly. The rear-wheel axle, the hub axle, the rotary axle of the sprocket and the installed base element extend on the same axis A.

In one refinement of the gearshift mechanism, the linkage mechanism is formed as a four-joint parallelogram with four pivot axles. All four pivot axles are oriented orthogonally with respect to the rear-wheel axis.

Owing to the pivot axles oriented orthogonally with respect to the rear-wheel axis, the linkage mechanism now moves only in the axial direction. Shocks acting on the gearshift mechanism, such as occur when riding on uneven terrain, can be accommodated by the linkage mechanism without moving the latter. Undesired gearshifts are prevented.

Furthermore, a gearshift mechanism with a straight four-joint parallelogram can be installed and set particularly easily. The installation and setting will be described in detail further below.

In one refinement of the gearshift mechanism, a first pivot axle rotatably connects an inner pivot arm of the linkage mechanism to an inner receptacle on the base element. A second pivot axle rotatably connects an outer pivot arm of the linkage mechanism to an outer receptacle on the base element. The receptacles are aligned axially with the pivot axles. The longitudinal axes of the receptacles thus run, exactly like the received pivot axles, orthogonally with respect to the rear-wheel axis. The receptacles are arranged on the second attachment end of the base element, which points in the direction of the linkage mechanism.

In one refinement of the gearshift mechanism, the chain guide arrangement comprises an upper chain guide roller. The upper chain guide roller is arranged so as to be rotatable with the movable element with a constant upper spacing to the rotary axle P of the chain guide arrangement. The gearshift mechanism furthermore comprises a lower chain guide roller which is arranged so as to be rotatable with the movable element with a constant lower spacing to the rotary axle P of the chain guide arrangement.

The upper spacing between the upper chain guide roller and the rotary axle P is dimensioned to be shorter than the lower spacing between the lower chain guide roller and the rotary axle P.

Aspects of the invention may be considered and implemented separately from one another and also in a combination. The embodiments illustrated show a combination of aspects. Embodiments would however also be conceivable which realize only one or two of the stated aspects. An example of this is a gearshift mechanism which realizes only the first two aspects but not the third aspect and which uses an oblique parallelogram, or slanted parallelogram, mechanism instead of a straight parallelogram mechanism. An alternative to this is a gearshift mechanism which realizes only the second and/or third aspect but not the first aspect and which comprises a base element with only one rather than two arms.

An oblique parallelogram would basically be conceivable but would have to be correspondingly adapted. This would be a possibility specifically in the case of racing bicycles, which are subjected to less severe shocks and which normally comprise sprocket assemblies with a smaller spread.

Owing to the improved positioning accuracy of the gearshift mechanism according to the invention relative to the sprocket assembly, it is conceivable to omit the conventional limit screws for the inner and outer stops of the gearshift mechanism. Said limit screws have hitherto been used to set the maximum movement of the gearshift mechanism in an axial direction and to prevent the chain guide arrangement from being moved axially beyond the sprocket planes of the larger sprocket (the inside) and of the smallest sprocket (the outside). The adjustment and readjustment of the limit screws is susceptible to faults. Fixed limit stops on the chain guide arrangement would be one possibility for replacing the screws. It would be possible for a first limit stop to interact with the largest sprocket in order to limit the axial movement towards the inside. It would be possible for a second limit stop to interact with the base element in order to limit the axial movement to the outside (cf. FIGS. 11 and 12).

According to one embodiment of the rear gearshift mechanism, the gearshift mechanism, in particular the movable element, has an arresting element. The arresting element makes it possible for the preloaded chain guide arrangement to be fixed relative to the movable element for the purposes of setting the gearshift mechanism. The setting process will be discussed in conjunction with the figures.

In one embodiment of the rear gearshift mechanism, the first attachment end of the base element has a first centering opening which interacts in the operationally ready state with a centering surface of the thru axle. The direct interaction of the first centering opening of the base element and of the centering surface of the thru axle leads to the direct centering of the base element on the thru axle. In other words, the base element is referenced with respect to the thru axle, such that manufacturing tolerances of the frame do not have an effect on the centering of the gearshift mechanism.

In one embodiment of the rear gearshift mechanism, a first limit stop is arranged on the movable element or on the chain guide arrangement. The first or inner limit stop is designed to interact with a sprocket assembly in an inner maximum position of the gearshift mechanism. The inner limit stop of the gearshift mechanism delimits an axial movement of the gearshift mechanism towards the inside. In the inner maximum position of the gearshift mechanism, a chain is situated on the inner most, that is to say largest, sprocket of the sprocket assembly. The first limit stop prevents the gearshift mechanism from being able to be moved further in an axial direction beyond the intended inner maximum position. A collision of the gearshift mechanism with the bicycle spokes is prevented.

In one embodiment of the rear gearshift mechanism, an outer limit stop is arranged on the chain guide arrangement. The second or outer limit stop is designed to interact, in an outer maximum position of the gearshift mechanism, with the base element. The outer limit stop of the gearshift mechanism limits an axial movement of the gearshift mechanism towards the outside. In the outer maximum position of the gearshift mechanism, a chain is situated on the outermost, that is to say smallest, sprocket of the sprocket assembly. The second limit stop prevents the gearshift mechanism from being able to be moved further in an axial direction beyond the intended outer maximum position.

The limit stops make it possible to omit conventional maintenance-intensive limit screws.

The described gearshift mechanism designs permit both radial centering of the base element on the adapter, more specifically on the bolt foot of the adapter, and radial centering of the base element directly on a centering surface of the thru axle. This has the advantage that the same base element can be used with thru axles of different diameter. The gearshift mechanism can remain largely unchanged. Only the adapter, in particular the bolt, for the fastening of the gearshift mechanism to the frame has to be adapted to the external dimensions of the respectively used thru axle. Common external diameters for the thru axles are 12 mm and 15 mm. This embodiment also enables the same hub arrangement to be adapted quickly and inexpensively to different conditions merely by exchanging the thru axle. For example, to increase the stiffness of the rear-wheel axle arrangement, a 12 mm thru axle can be replaced with a 15 mm thru axle. Different wall thickness configurations of the 15 mm thru axle furthermore permit adaptation to particularly lightweight or particularly rigid rear-wheel axle arrangements.

A fourth aspect of the invention constitutes an alternative solution for referencing of the gearshift mechanism that is independent of frame tolerances. In one embodiment, the rear gearshift mechanism is suitable for coaxial installation on a rear-wheel axis. The gearshift mechanism has a base element, a linkage mechanism, a movable element and a chain guide arrangement. The linkage mechanism connects the base element to the movable element. The chain guide element is connected, rotatably about a rotary axle P, to the movable element. The base element comprises a first attachment end for coaxial installation on the rear-wheel axis and a second attachment end for coupling to the linkage mechanism. The first attachment end of the base element has a first centering opening for the purposes of directly centering the base element on a thru axle.

In one embodiment of the rear gearshift mechanism, the first centering opening is formed in a first arm of the base element.

In the operationally ready state, the first centering opening of the base element interacts directly with the screwed-in thru axle, in particular with a centering surface of the thru axle. The direct interaction of the first centering opening of the base element and the centering surface of the thru axle leads to the centering of the base element directly on the thru axle. In other words, the base element is referenced with respect to the thru axle, such that manufacturing tolerances of the frame do not have an effect on the centering of the gearshift mechanism.

In one embodiment, the base element has a second arm which is arranged so as to be spaced apart in an axial direction from the first arm. The second arm has a second centering opening. In the operationally ready state, the first centering opening of the first arm interacts with the centering surface of the thru axle and the second centering opening of the second arm interacts with the adapter, in particular with the external diameter of the bolt head of the adapter. This arrangement permits precise orientation of the rear gearshift mechanism perpendicular to the rear-wheel axis.

In one embodiment of the rear gearshift mechanism, the base element is designed to abut in the operationally ready state axially against a hub end cap. In particular, an axial hub stop surface of the first arm of the base element is designed to abut against the hub end cap.

In one embodiment of the rear gearshift mechanism, the linkage mechanism comprises at least one pivot axle which is oriented orthogonally with respect to the rear-wheel axis. The advantages of orthogonally oriented gearshift mechanisms have already been discussed in conjunction with the preceding embodiments.

A fifth aspect of the invention relates to a thru axle for screwing into a rear gearshift mechanism, in particular into a gearshift mechanism for coaxial installation as has been described above. According to the fifth aspect, the thru axle is suitable for screwing into a rear gearshift mechanism. The thru axle has a first thru axle end and a second thru axle end. The thru axle has, on an outer circumferential surface in the region of the second end, an external thread and a centering surface. The centering surface serves for the centering of the base element directly on the thru axle. In the screwed-in state, the centering surface of the thru axle interacts with a first centering opening of the base element for the purposes of directly centering the base element on the thru axle.

In one embodiment, the thru axle is of hollow form. The thru axle has a greater wall thickness in the region of the external thread and/or of the centering surface than in other regions.

A sixth aspect of the invention provides an adequately stiff and lightweight rear-wheel axle arrangement for a bicycle (stiffness to weight ratio). This embodiment is of importance in particular for MTBs and E-MTBs. Rear-wheel axle arrangements known from the prior art exhibit a tendency for the hub axle (hollow axle) to break. This is inter alia because the hub axle is subjected to high maximum bending stresses in relation to the thru axle. It has proven to be advantageous for the acting stresses and forces to be distributed as uniformly as possible on the hub axle and the thru axle and for a breakage of one of the two components to thus be prevented. Both the hub axle and the thru axle are loaded more uniformly, and are no longer overloaded on one side. A uniform distribution is achieved in particular if the ratio of the geometrical moment of inertia of the hub axle to the geometrical moment of inertia of the thru axle is relatively balanced. The geometrical moment of inertia ratio of hub axle to thru axle lies in the range from approximately 0.8 to 1.5, and is in particular approximately 1.1. A positive effect is realized inter alia by the fact that the hub axle is subjected to compressive load and the thru axle is subjected to tensile load. The compressive and tensile stresses are superposed on the bending stresses, and partially cancel one another out.

According to the sixth aspect, a rear-wheel axle arrangement for a bicycle comprises a hub arrangement and a thru axle. The hub arrangement comprises a rear-wheel hub (also referred to as hub sleeve) which is rotatable about the rear-wheel axis, a hollow hub axle (also referred to as hollow axle), and a hub bearing arrangement. The hub bearing arrangement enables the rear-wheel hub to be mounted so as to be rotatable relative to the hub axle about the rear-wheel axis. The hollow thru axle is, for the purposes of fixing the hub arrangement to a bicycle frame, designed such that it can be inserted into the hollow hub axle and screwed into a rear gearshift mechanism. The hollow thru axle has, at least in the region of the hub bearing, a wall thickness which is dimensioned to be at least as great as a wall thickness of the hub axle.

Owing to the considerably increased geometrical moment of inertia, thru axles with an increased external diameter of 15 mm have a positive effect on the stiffness of the entire rear-wheel axle arrangement. The thru axle is likewise a load-bearing component. The increased diameter of the thru axle contributes to a balanced geometrical moment of inertia of hub axle and thru axle. In particular, rear-wheel axle arrangements have proven to be successful which have a hub axle with an external diameter of approximately 17 mm and an internal diameter of approximately 15 mm combined with a thru axle with an external diameter of approximately 15 mm. The diameter of the thru axle and of the hub axle are coordinated with one another such that the thru axle can be inserted into the hub axle with a clearance fit. The thru axle may, depending on the field of use, have for example a wall thickness of 1.5 mm (standard), 1 mm (lightweight) and 2 mm (E-bike). These configurations lead to a balanced load on hub axle and thru axle. The different thru axles may be used with the same hub axle depending on the field of use. In other words, the same hub arrangement can be inexpensively and quickly adapted by exchanging the thru axle (modular principle).

The aspects of the invention may be considered and implemented separately from one another or in a combination of multiple aspects.

The invention furthermore relates to a bicycle drive which comprises a gearshift mechanism according to the invention, a multi-sprocket arrangement with eleven, twelve or more sprockets, a bicycle chain and a chain ring arrangement with in particular exactly one chain ring. In an embodiment the gearshift mechanism may be electrically controlled. Likewise, in the case of multiple chain rings, the derailleur may also be electrically controlled. Wireless control of the gearshift mechanism and/or of the derailleur is particularly advantageous. Electrically controlled gearshift mechanisms commonly comprise a transmission unit and a battery. It would be possible for the transmission unit and/or battery to be arranged in space-saving fashion in a cavity of the base element, for example between the two arms of the base element. At this position, they would be protected against external action by the structure of the base element, and immovable relative to the frame.

At least one sprocket of the sprocket arrangement may have a sequence of a thin tooth, a thick tooth and a further thin tooth. Here, a thick tooth is designed to be of such a thickness in an axial direction that, although it can engage into an outer link pair of the chain, it cannot engage into an inner link pair. This has a positive effect on the chain guidance. The sequence may repeat multiple times along the circumference of a sprocket. In the case of sprockets with an even number of teeth, it is also possible for all of the teeth to be alternately thin and thick. The axial thickening may be realized either on both sides of the sprocket or only on one side. The thickening is preferably arranged only on the rear side of the sprocket. It is of particular significance in particular on the two largest sprockets, because it is there that the chain skew is at its most pronounced (cf. FIG. 11 with thick and thin teeth on the largest sprocket 12). As a result of the better guidance of the chain, the adverse consequences of the chain skew at the relatively large sprockets are minimized. The chain ring may also have alternating thick and thin teeth which serve for improved chain guidance.

In an embodiment, a rear gear shifting mechanism (10) for a bicycle includes a base element (20), a linkage mechanism (30), a movable element (40), and a chain guide arrangement (50). In the embodiment the linkage mechanism (30) connects the base element (20) to the movable element (40), and the chain guide arrangement (50) is connected, rotatably about a rotary axle axis (P), to the movable element (40). In this embodiment the base element (20) comprises a first attachment end (21) for coaxial installation on the rear-wheel axle axis (A) and a second attachment end (29) for coupling to the linkage mechanism (30).

In an embodiment the rear gear shifting mechanism is configured such that the first attachment end (21) has a first arm (22a) and a second arm (22b), which are arranged so as to be spaced apart from one another in an axial direction.

In an embodiment, the rear gear shifting mechanism (10) is configured such that the base element (20), in particular the hub stop surface (26) of the first arm (22a), abuts in an operationally ready state axially against a hub end cap (4).

In an embodiment, the rear gear shifting mechanism is configured such that the linkage mechanism (30) comprises at least one pivot axle (31, 32, 33, 34) which is oriented orthogonally with respect to the rear-wheel axis (A).

In an embodiment, the rear gearshift mechanism (10) is configured such that the gearshift mechanism (10), in particular the movable element (40), has an arresting element (42) which makes it possible for the preloaded chain guide arrangement (50) to be fixed relative to the movable element (40) for the purposes of setting the gearshift mechanism (10).

In an embodiment, the rear gearshift mechanism (10) is configured such that the first attachment end (21) of the base element (20) has a first centering opening (23a) which is designed to interact in the operationally ready state with a centering surface (87, 97) of the thru axle (80, 90) for the purposes of centering the base element (20) on the thru axle (80, 90).

In an embodiment, the rear gearshift mechanism (10) is configured such that on the movable element (40) or on the chain guide arrangement (50), there is arranged an inner limit stop (59a) which is designed to interact, in an inner maximum position of the gearshift mechanism (10), with a sprocket assembly (R) in order to limit an axial movement of the gearshift mechanism (10) in an inwards direction.

In an embodiment, the rear gearshift mechanism (10) is configured such that on the chain guide arrangement (50), there is arranged an outer limit stop (59b) which is designed to interact, in an outer maximum position of the gearshift mechanism (10), with the base element (20) in order to limit an axial movement of the gearshift mechanism (10) in an outward direction.

In an embodiment, a rear gearshift mechanism (10) for coaxial installation on a rear-wheel axis (A) is provided. The gearshift mechanism includes a base element (20), a linkage mechanism (30), a movable element (40), and a chain guide arrangement (50). The linkage mechanism (30) connects the base element (20) to the movable element (40). The chain guide arrangement (50) is connected, rotatably about a rotary axis (P), to the movable element (40). The base element (20) comprises a first attachment end (21) for coaxial installation on the rear-wheel axis (A) and a second attachment end (29) for coupling to the linkage mechanism (30). In this embodiment the gearshift mechanism is configured such that the first attachment end (21) of the base element (20) has a first centering opening (23a) for the purposes of directly centering the base element (20) on a thru axle (80, 90). In this embodiment, the first centering opening (23a) is formed in a first arm (22a) of the base element (20). The base element (20) may have a second arm (22b) which is arranged so as to be spaced apart in an axial direction from the first arm (22a). The base element (20), in particular an axial hub stop surface (26) of the first arm (22a) may be designed to abut in an operationally ready state axially against a hub end cap (4). The linkage mechanism (30) may include at least one pivot axle (31, 32, 33, 34) which is oriented orthogonally with respect to the rear-wheel axis (A).

In an embodiment, a thru axle (80, 90) for screwing into a rear gearshift mechanism is provided. The thru axle having a first thru axle end (81, 91) and a second thru axle end (82, 92), wherein the thru axle (80, 90) has, in the region of the second end (82, 92), an external thread (83, 93) and a centering surface (87, 97) for the purposes of directly centering the base element (20) on the thru axle (80, 90). In this embodiment, in the screwed-in state of the thru axle (80, 90), the centering surface (87, 97) of the thru axle (80, 90) may interact with a first centering opening (23a) of the base element (20) for the purposes of directly centering the base element (20) on the thru axle (80, 90). In this embodiment the thru axle (80, 90) may be of hollow form and may have a greater wall thickness (W86, W96) in the region of the external thread (83, 93) and/or of the centering surface (87, 97) than in another region of the thru axle (80, 90).

In an embodiment, a rear-wheel axle arrangement for a bicycle is provided. The axle arrangement includes a hub arrangement having a rear-wheel hub (3) which is rotatable about a rear-wheel axis (A), having a hollow hub axle (5) and having a hub bearing arrangement (9) for the rotatable mounting of the rear-wheel hub (3) relative to the hub axle (5). The axle arrangement also includes a hollow thru axle (80, 90) which, for the purposes of fixing the hub arrangement on a bicycle frame (1), is designed such that it can be inserted into the hollow hub axle (5) and screwed into a rear gearshift mechanism (10). The axle may be configured such that the hollow thru axle (80, 90) has, at least in the region of the hub bearing (9), a wall thickness (W85, W94a) which is dimensioned to be at least as great as a wall thickness (W5) of the hub axle (5).

Figure 13:
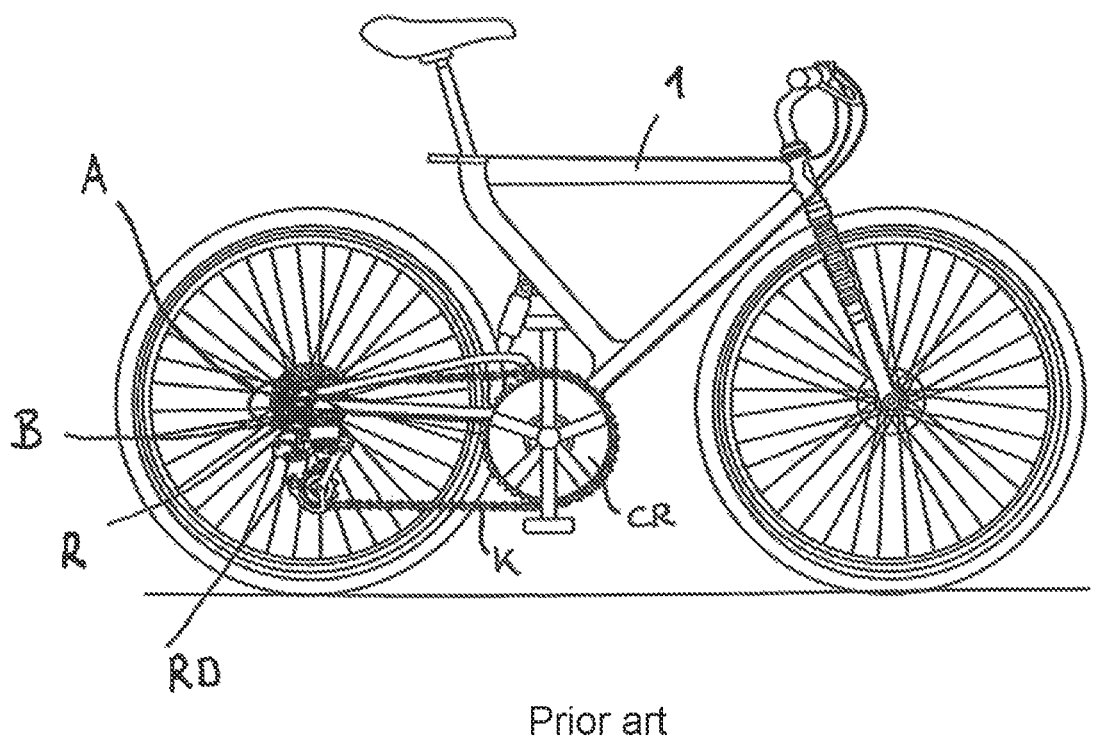
FIG. 13 shows a bicycle with a conventional gearshift mechanism.

FIG. 13 shows, by way of example, a bicycle having a bicycle drive known from the prior art. The bicycle drive comprises a front sprocket CR, a rear pinion assembly R and a chain K, which can be moved from one pinion to the next by means of the rear gearshift mechanism RD. The directional specifications left/right and front/rear used below relate to a bicycle as viewed in a direction of travel. The bicycle frame 1 has a left-hand and a right-hand rear dropout, between which the rear wheel is installed. The rear wheel rotates together with the pinion assembly R about the rear-wheel axle A. The expression "axial" relates to the rear-wheel axle A or the axis of rotation A of the multi-pinion arrangement R. The largest pinion is situated axially further to the inside than the smaller pinions. The teeth are arranged radially at the outside on the pinions. The external diameter of a pinion is the radially outer end, and the internal diameter is the radially inner end of the pinion. The gearshift mechanism RD shown here is fastened in a conventional manner by means of a derailleur hanger to the right-hand dropout of the frame. The known gearshift mechanism RD is thus spaced apart from the rear-wheel axle A and is installed so as not to be coaxial with respect to the latter. The gearshift mechanism RD rotates about the B-axle, which is spaced apart from the axle A. The pivot mechanism of the gearshift mechanism is designed as an oblique parallelogram.

For improved understanding of the invention, the figures show different stages of installation of the gearshift mechanism and of the rear-wheel axle arrangement on different scales.

FIG. 1 shows a perspective view of the rear gearshift mechanism 10 according to the invention installed coaxially on the rear-wheel axle 6. For a better overview, the rear wheel and the pinion assembly are illustrated. It is possible to see the rear-wheel hub 3 arranged between the two dropouts of the frame 1, and the gearshift mechanism 10 which engages around the right-hand dropout. The base element 20 is installed on the frame 1 coaxially with respect to the axle A by means of the adapter 60.

Figure 2:
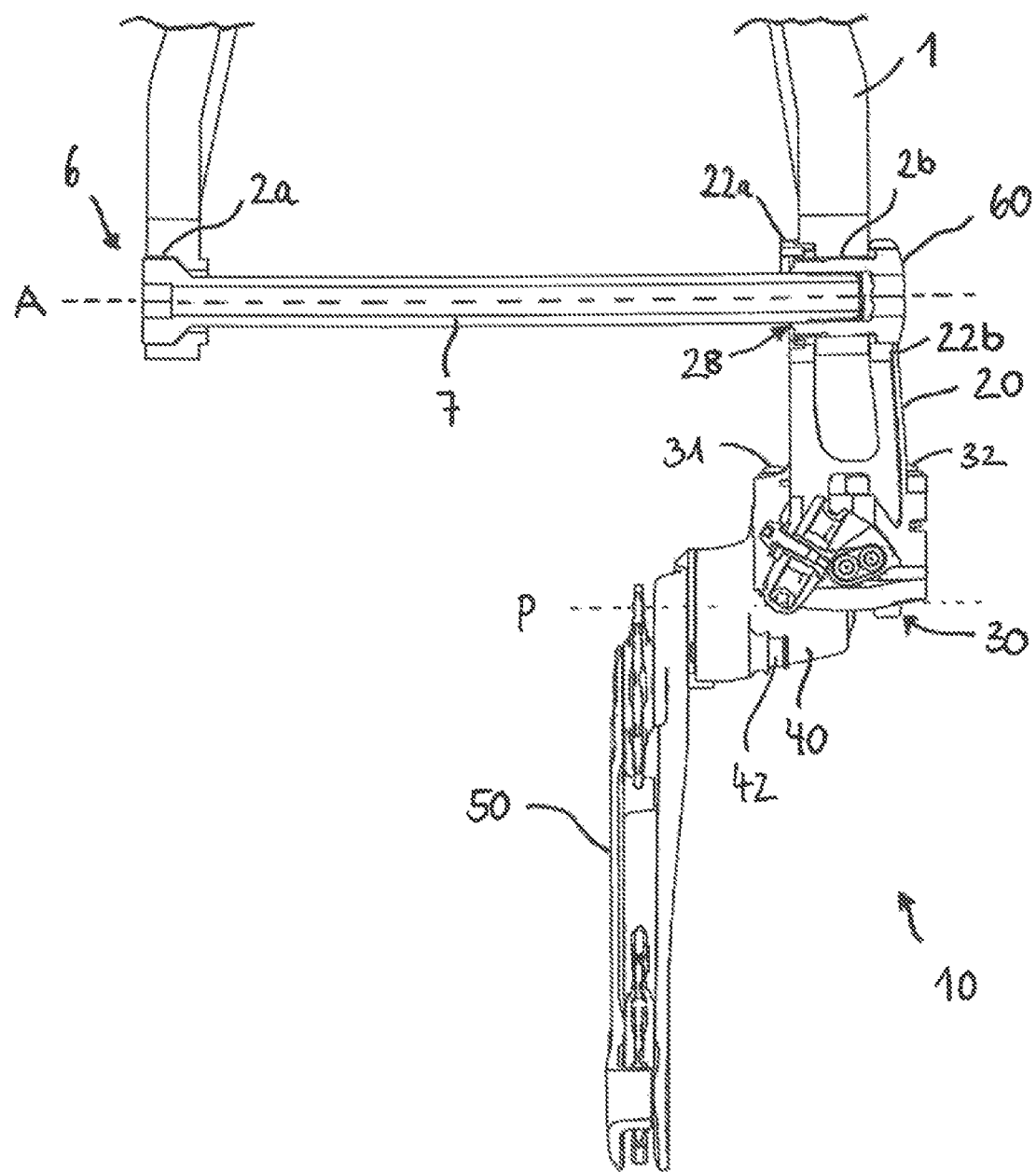
FIG. 2 shows a sectional illustration of FIG. 1 along the axis A without a hub arrangement.

FIG. 2 shows a section along the axis A of the gearshift mechanism 10 illustrated in FIG. 1 in a view from the rear. The geometrical axis A extends along the rear-wheel axle 6. For the sake of simplicity, in this illustration, only the plug-in axle 7 and not the other parts of the axle and hub arrangement is shown. The base element 20 is fastened by means of the adapter 60 to the right-hand dropout. For this purpose, the adapter 60 extends to the right-hand frame opening 2b. The plug-in axle 7 is inserted into the left-hand frame opening 2a and is screwed together with the adapter 60. The adapter 60 simultaneously serves as a counterbearing for the plug-in axle 7. When the plug-in axle 7 is tightened, it is screwed further into the adapter 60 and clamped relative to the frame 1.

Figure 3:
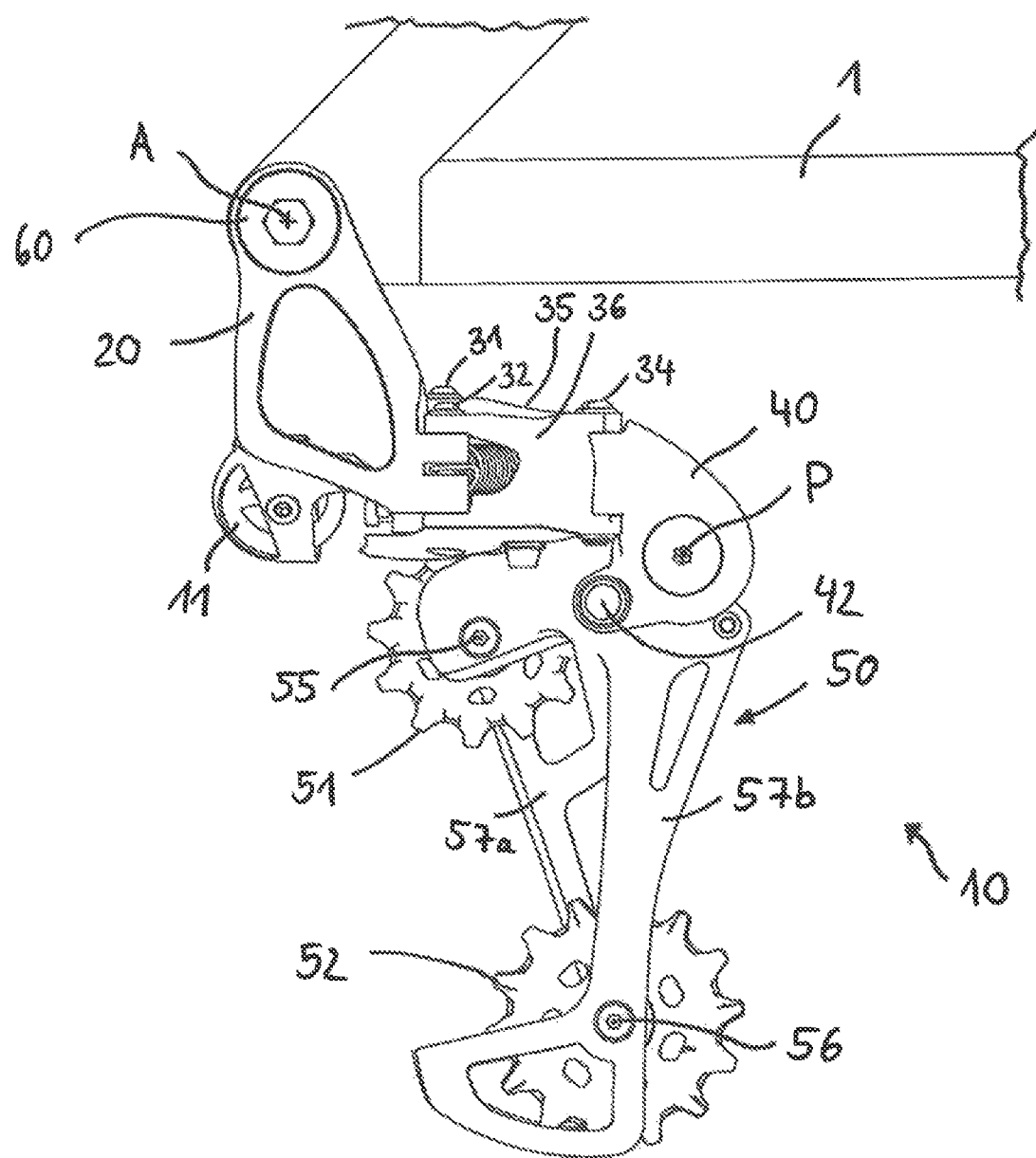
FIG. 3 shows a side view of the gearshift mechanism.

FIG. 3 shows a side view of the gearshift mechanism 10, installed according to the invention on the frame 1, from FIG. 2. FIGS. 1 to 3 each show the entire gearshift mechanism 10 with the base element 20, the pivot mechanism 30, the movable element 40 and the chain guide arrangement 50. On the base element 20 there is arranged a cable diverter 11, in this case in the form of a cable diverting roller mounted rotatably at the attachment point 29c. The base element 20 is installed, at its first, upper attachment end coaxially with respect to the rear-wheel axle A, on the frame 1. For this purpose, two arms, which are spaced apart from one another in an axial direction, of the base element 20 engage around the dropout of the frame 1, such that one arm is arranged on the inner side of the frame 1 and the other arm is arranged on the outer side of the frame 1. The base element 20 is pre-installed with the adapter 60 on the frame 1. Furthermore, the base element 20 is coupled at its second, lower attachment end to the pivot mechanism 30. The pivot mechanism 30 is formed as a four-joint parallelogram with an inner pivot arm 35, an outer pivot arm 36 and four pivot axles 31, 32, 33, 34. The four pivot axles 31, 32, 33, 34 run in each case in planes which intersect the axis A at right angles. In other words, the pivot axles 31, 32, 33, 34 lie in planes which extend parallel to the pinion planes that are not shown here (cf. FIGS. 11 to 13). The first and second pivot axles 31, 32 connect the pivot mechanism 30 to the base element 20. The third and fourth pivot axles 33, 34 connect the pivot mechanism 30 to the movable element 40. Both the base element 20 and the movable element 40 have in each case two receptacles for the pivot axles. The longitudinal axes L1, L2 of the receptacles on the base element 20 and the longitudinal axes of the receptacles on the movable element 40 are, like the pivot axles 31, 32, 33, 34 themselves, oriented orthogonally with respect to the rear-wheel axle 6 or the axis A (cf. FIGS. 4 to 9). The chain guide arrangement 50 is connected, rotatably about the axle P, to the movable element 40 and is preloaded clockwise (rearwards) such that a chain (not shown here) which runs through the chain guide 50 in S-shaped fashion is tensioned. The chain guide arrangement 50 comprises an upper and a lower chain guide roller 51, 52, which are each rotatably mounted between two cage halves 57a, 57b. The upper chain guide roller 51 is arranged, so as to be rotatable about the upper rotary axle 55, with an upper spacing to the axle P. The lower chain guide roller 56 is arranged, so as to be rotatable about the lower rotary axle 56, with a lower spacing to the P-axle, wherein the upper chain guide roller 51 is arranged with a smaller spacing to the P-axle than the lower chain guide roller 52. The movable element 40 has an arresting element 42 which makes it possible for the preloaded chain guide arrangement 50 to be fixed relative to the movable element 40. The gearshift mechanism 20 can thus be installed without the chain guide arrangement 50 snapping rearwards owing to the preload.

During a gearshift to a smaller pinion, the chain guide arrangement 50 rotates rearwards clockwise about the rotary axle P of the movable element 40. Conversely, during a gearshift to a next-larger pinion, the chain guide arrangement 50 rotates forwards counterclockwise about the rotary axle P. As a result of the rotational movement about the axle P, the upper chain guide roller 51 is moved radially towards or away from the pinion. The chain guide arrangement 50 is moved in an axial direction by virtue of the pivot arms 35, 36 being pivoted about the pivot axles 31, 32, 33, 34. Depending on the gearshift direction, the upper chain guide roller 51 moves together with the entire chain guide arrangement 50 inwards or outwards in an axial direction.

Figure 4:
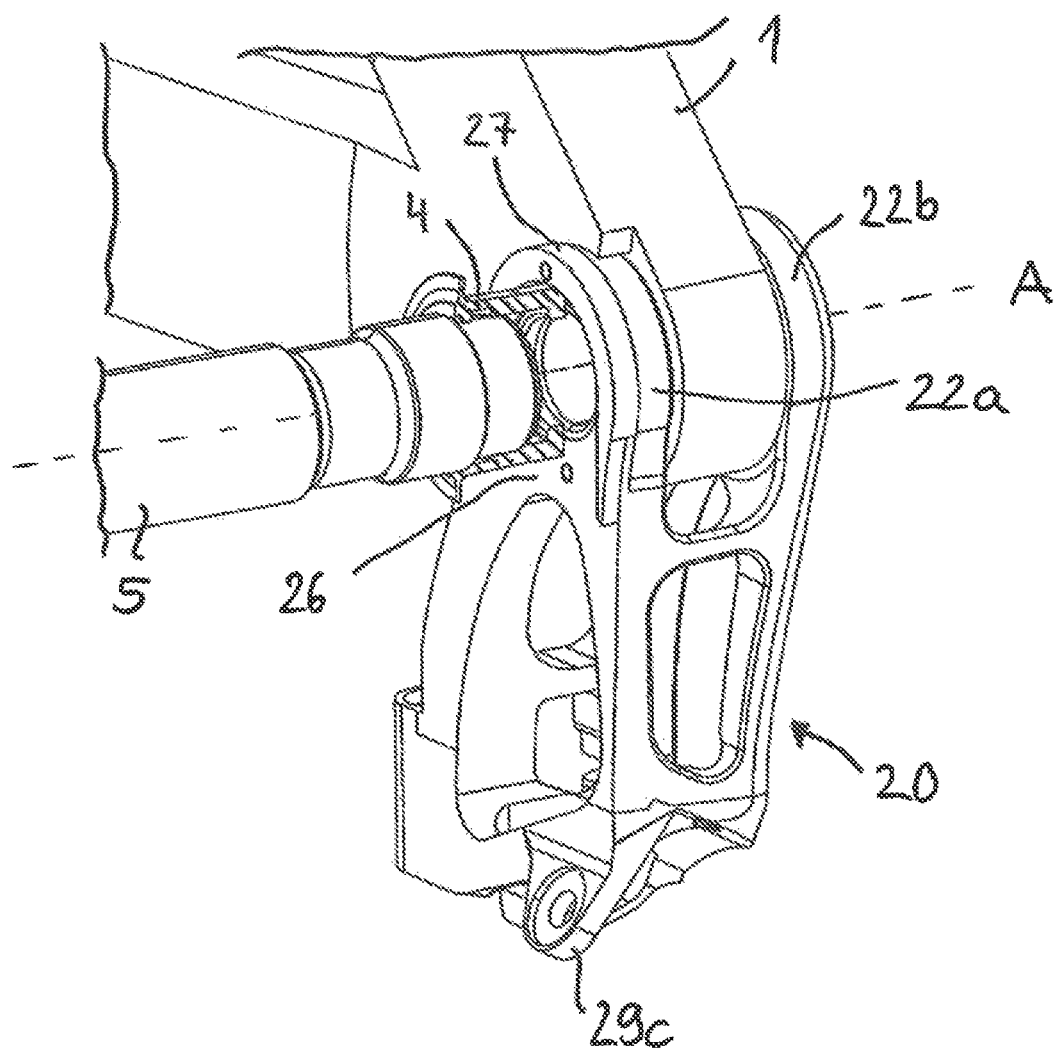
FIG. 4 shows a perspective view from the inside of the base element installed on the frame.
Figure 5:
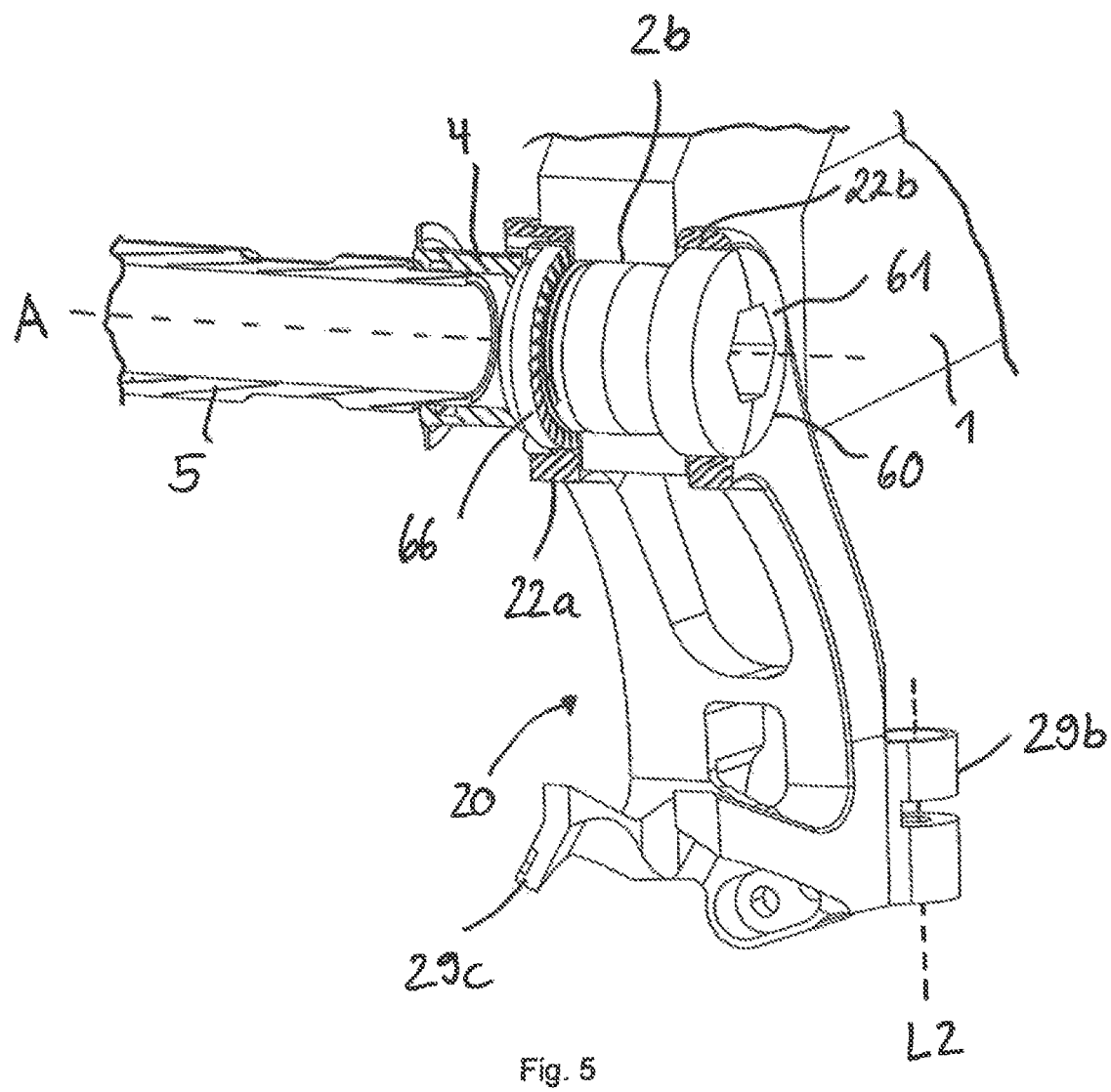
FIG. 5 shows a perspective partial section of the base element from FIG. 4 with adapter.

FIGS. 4 and 5 each show perspective partial sections of the base element 20, installed on the frame 1 by means of the adapter 60, and parts of the hub arrangement. The first arm 22a and the second arm 22b are positioned in each case on one side of the frame 1. For the installation of the rear wheel (not shown here), said rear wheel is guided together with the hub arrangement (only the hollow axle 5 is shown here) and the hub end cap 4 along the hub guide 27 on the inner side of the base element 20. The hub guide 27 is formed as a collar with tapering guide surfaces. The hub end cap 4 bears in its end position radially against the hub guide 27. In the axial direction, the hub end cap 4 abuts against the axial hub stop surface 26 on the inner side of the base element 20. The hub end cap 4 is illustrated in section.

FIG. 5 shows a section through the base element 20 with the two arms 22a, 22b engaging around the adapter 60. The adapter 60 is composed of the bolt 61 and the nut 66. The bolt 61 is screwed into the nut 66 such that the bolt head 62 and the nut 66 are clamped on the frame 1. The adapter 60 can thus be fixed relative to the frame 1. The base element 20 is centred on the adapter 60. In the operationally ready state, with the plug-in axle 7 tightened, the base element 20 is rotationally fixedly clamped between the hub end cap 4 and the adapter 60. In the fully installed state, the base element 20 bears in an axial direction only against the hub end cap 4 and against the adapter 60. The base element 20 is installed on the frame 1 indirectly by means of the adapter 60. The base element 20 and thus the entire gearshift mechanism 10 is referenced with respect to the hub 4, and not with respect to the frame 1 in the conventional manner.

Figure 6:
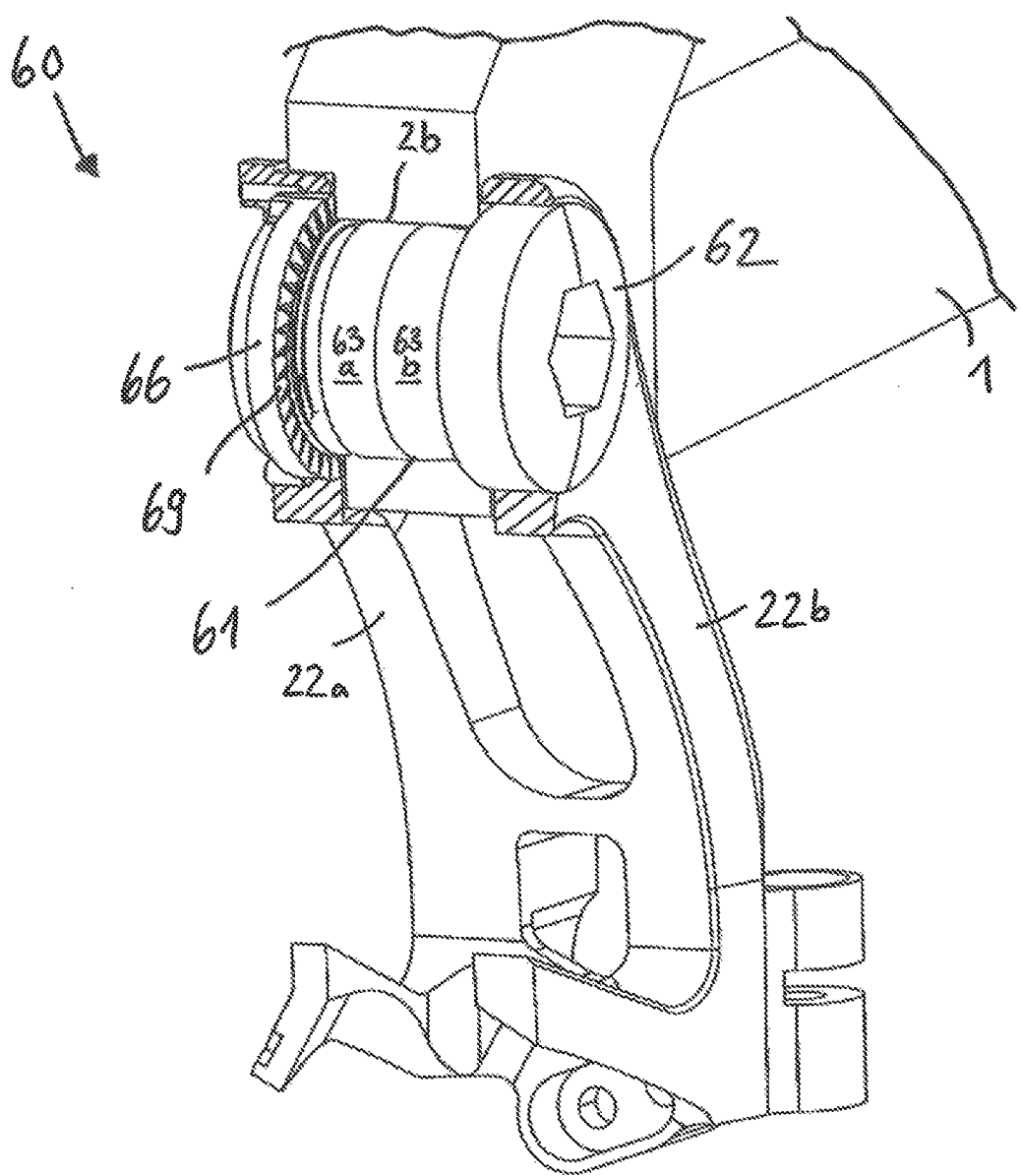
FIG. 6 shows an enlarged view of FIG. 5 without a hub arrangement.

FIG. 6 shows the enlarged partial section of the base element 20, installed on the frame 1 by means of the adapter 60, from FIG. 5. The bolt head 62 and the nut 66 are dimensioned to be larger than the frame opening 2b. When the adapter 60 is tightened, the bolt head 62 and the nut 66 bear in frictionally locking fashion against the frame 1. The nut 66 has a knurled surface 69 in order to additionally produce a positively locking connection to the frame 1 and counteract a forward (counterclockwise) rotation of the gearshift mechanism 10. The bolt body 63 has a contact region 63a, which bears with little play against the frame opening 2b and has a compensation region 63b which has a greater amount of play with respect to the frame opening 2b. The compensation region 63b makes it possible for the adapter 60 in the frame opening 2b to be oriented along the axis A. The bolt 61 exhibits play in the frame opening 2b and can tilt slightly therein if the frame opening is not exactly aligned with the axle A.

Figure 7:
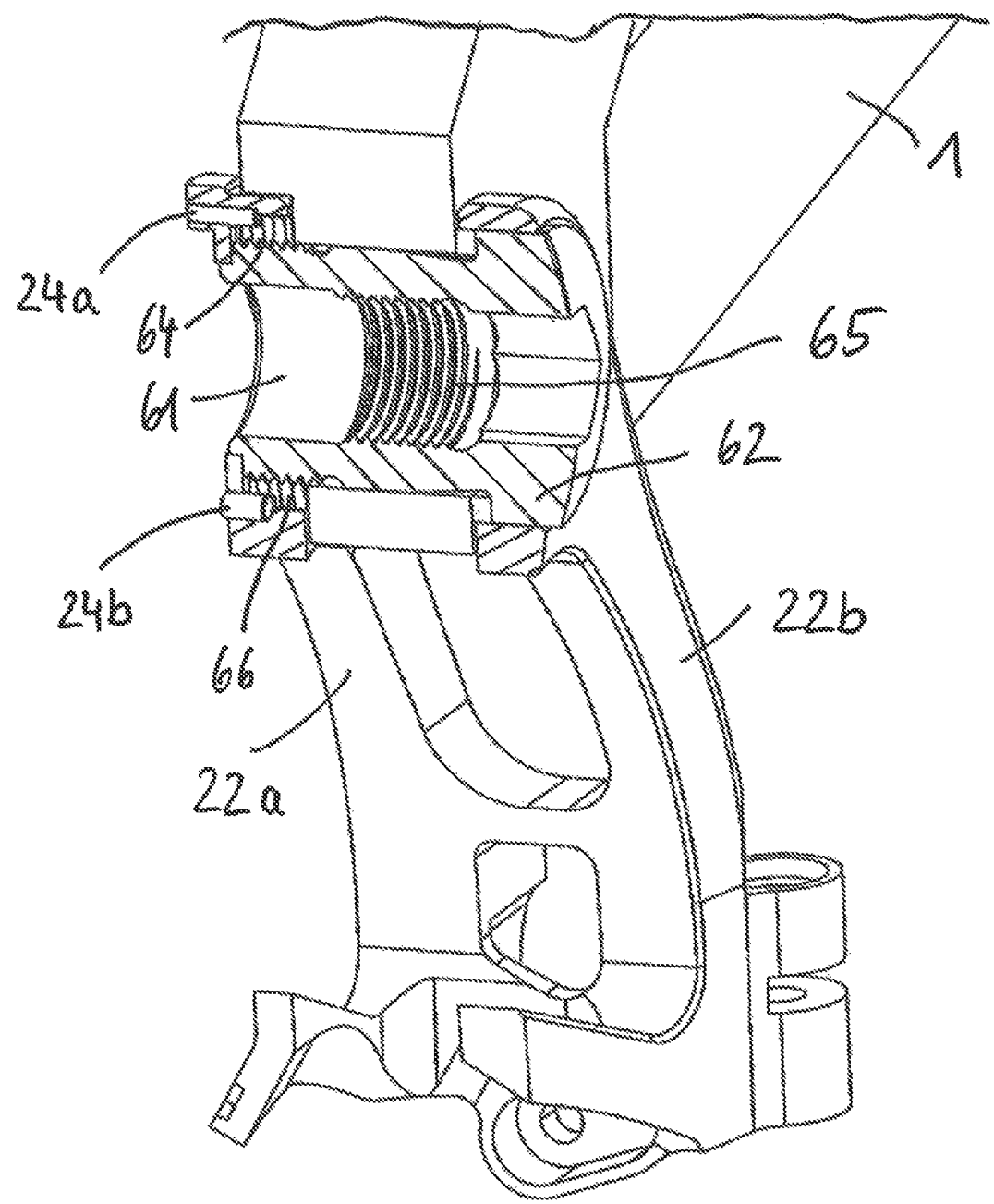
FIG. 7 shows a fully sectional illustration of the arrangement from FIG. 6.

FIG. 7 shows the arrangement from FIG. 6 with the adapter 60 in section. The adapter 60 has two tasks: 1) The clamping on the frame 1 is produced by means of the screw connection between bolt 61 and nut 66. It would alternatively also be possible for the nut to be arranged at the outside and the bolt to be arranged at the inside. It is important that the adapter 60 is fixable relative to the frame 1 and adaptable to said frame in an axial direction. The screw connection is tightened further in the case of a relatively thin frame than in the case of a relatively thick frame. 2) The adapter 60 is rotatable clockwise relative to the base element 20 only to a limited extent and thus constitutes a rotation prevention means. For this purpose, on the nut 66, there are arranged two stops 68a, 68b, which interact with two pins 24a, 24b on the base element 20. A forward (counterclockwise) rotation of the gear shift mechanism 10 is possible only to a limited extent owing to the rotation prevention action between adapter 60 and base element 20. The rotation prevention action replaces the conventional B-screw and protects against undesired forward rotation of the gear shift mechanism.

The external thread 64 and the internal thread 65 of the bolt 61 are arranged in different regions along the bolt 61, in order to thereby be able to more effectively accommodate forces. The plug-in axle 7 is screwed into the internal thread 65 and pulls the adapter 60, in particular the bolt head 62, against the outer side of the frame 1. In the exemplary embodiment shown, a washer is arranged between the bolt head 62 and the frame 1.

Figure 8:
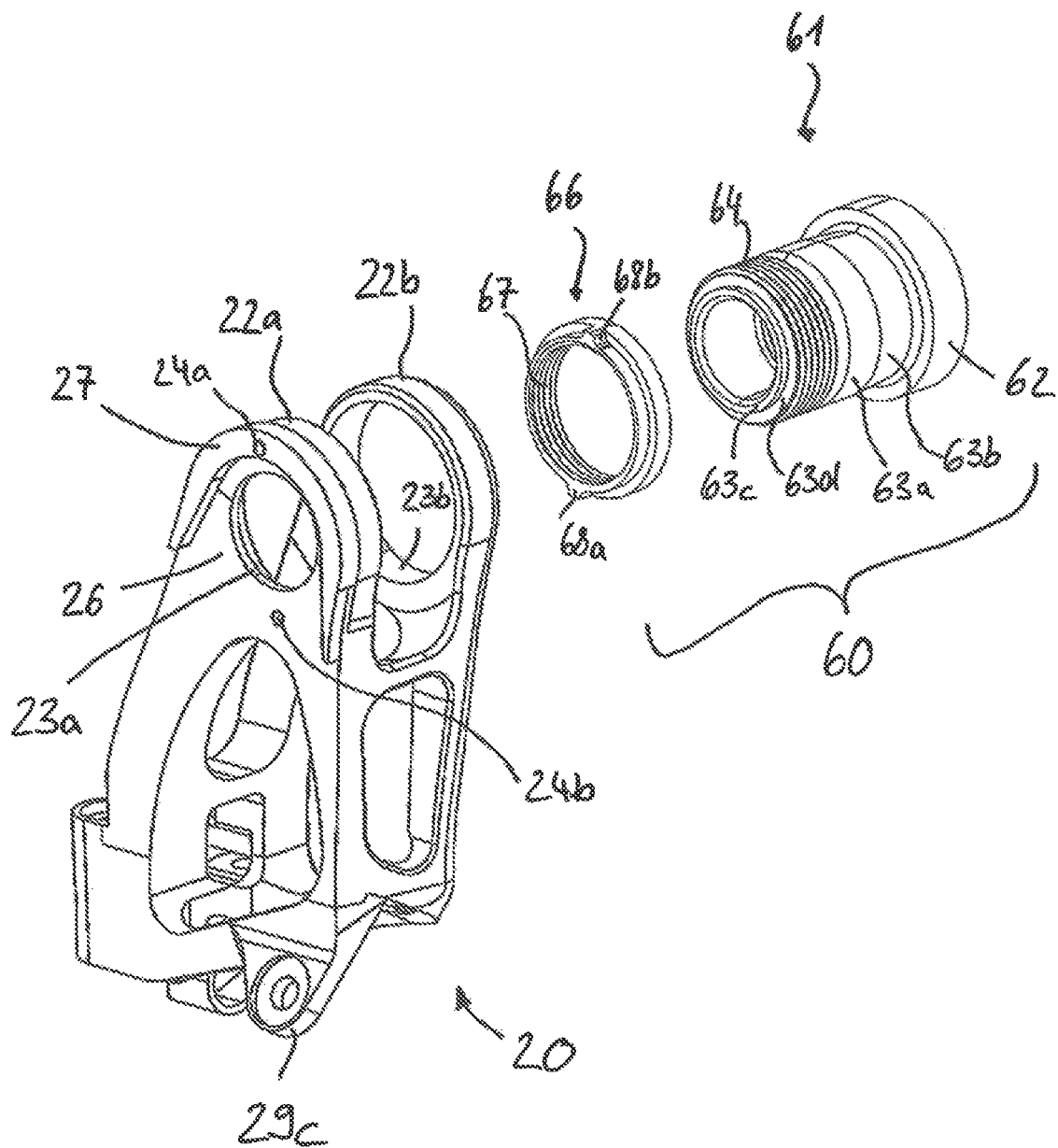
FIG. 8 shows an exploded illustration of the base element and of the adapter.

In this regard, see also FIG. 8, which shows an exploded illustration of the non-installed base element 20 and of the adapter 60 from FIG. 7. In this view, the internal thread 67 of the nut 66 and the external thread 64 of the bolt 61, which together form the screw connection of the adapter 60, can be clearly seen. It would alternatively also be possible for the bolt to be screwed directly into a thread of the frame opening. Then, frame tolerances would however have a direct effect on the gearshift mechanism, which must be avoided. The bolt foot 63c coordinated with the first centring opening 23a and the bolt head 62 coordinated with the second centring opening 23b can also be seen. The stop surface 63d of the bolt 61 interacts with the outer side, which is facing away in this case, of the first arm 22a of the base element 20 (cf. FIG. 9a).

Figure 9A:
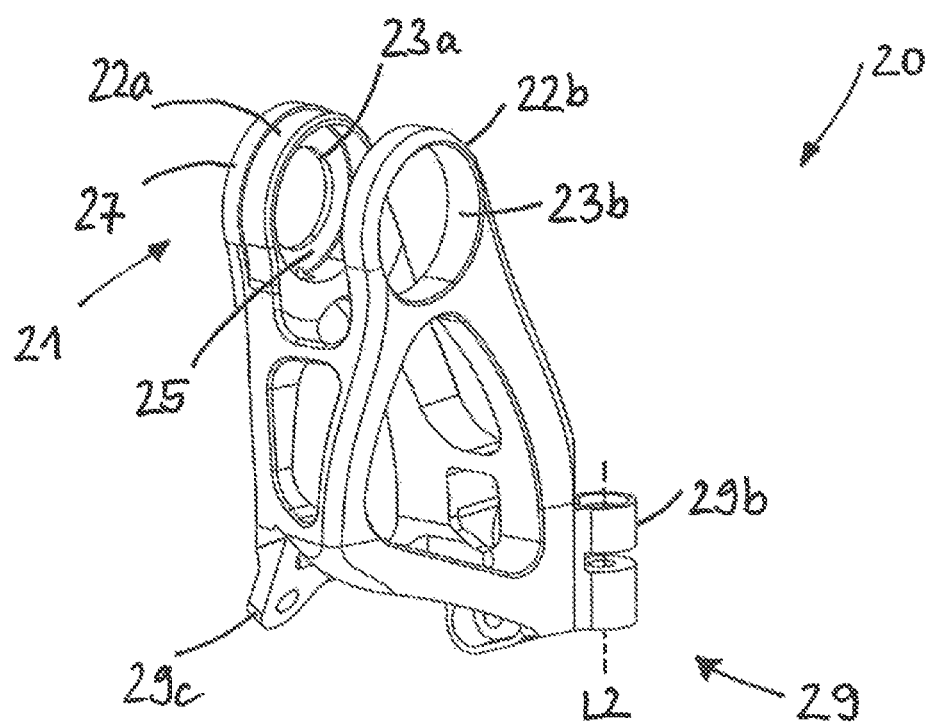
FIG. 9a shows a perspective view from the outside of the base element.
Figure 9B:
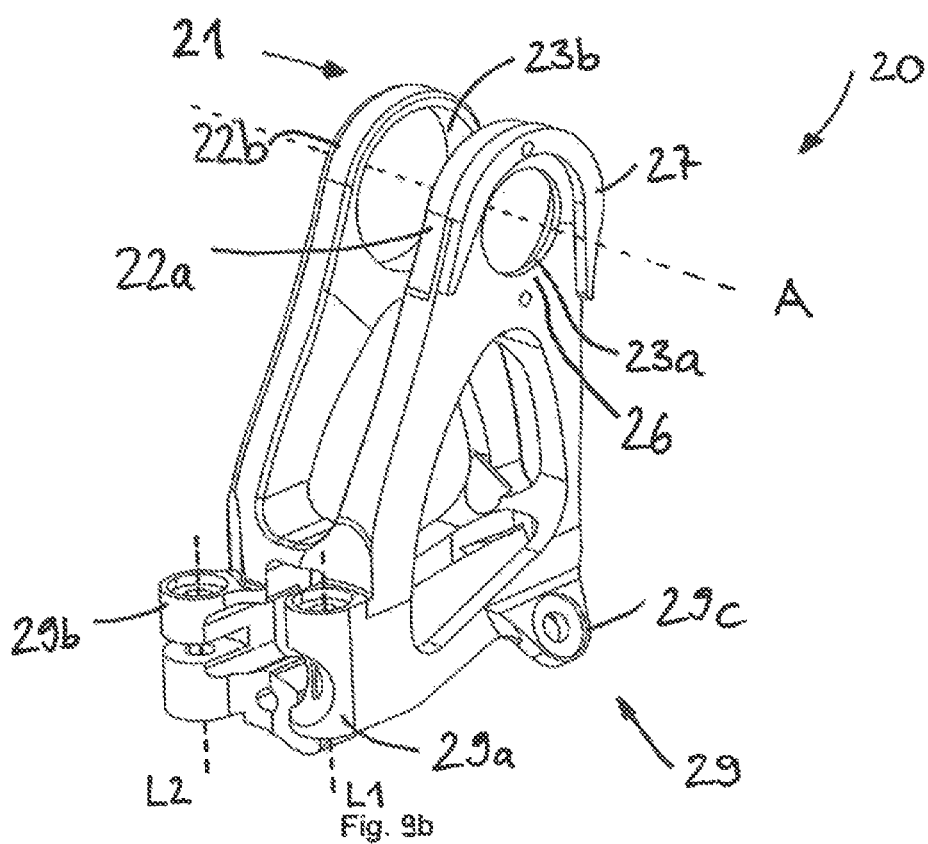
FIG. 9b shows a perspective view from the inside of the base element.

FIGS. 9a and 9b show a perspective view from the outside and a perspective view from the inside of the base element 20 with the first and second centring openings 23a, 23b. The first centring opening 23a is coordinated with the external diameter of the bolt foot 63c of the bolt 61. The second centring opening 23b is coordinated with the external diameter of the bolt head 61. On the outer side of the first arm 22a, the adapter stop surface 25 can be seen, which interacts with the stop surface 63d of the bolt 61. The hub stop surface 26 is arranged on the oppositely situated inner side of the first arm 22a. In the operationally ready state, the bolt 61 is clamped with the bolt stop surface 63d against the outer side, and the hub end cap 4 is clamped against the inner side, of the base element 20. At the lower attachment end of the base element 20 there is situated the attachment point 29c for a cable diverter 11. Also situated at the lower attachment end of the base element 20 is the first receptacle 29a for the first pivot axle 31 and the second receptacle 29b for the second pivot axle 32 of the pivot mechanism 30 that is not shown here. The longitudinal axes L1, L2 of the first and second receptacles 29a, 29b run in planes which intersect the rear-wheel axle A in each case at right angles. The four pivot axles 31, 32, 33, 34 of the four-joint parallelogram 30 are thus oriented orthogonally with respect to the common pinion axle A regardless of the selected relative position of the gearshift mechanism 10.

Figure 10:
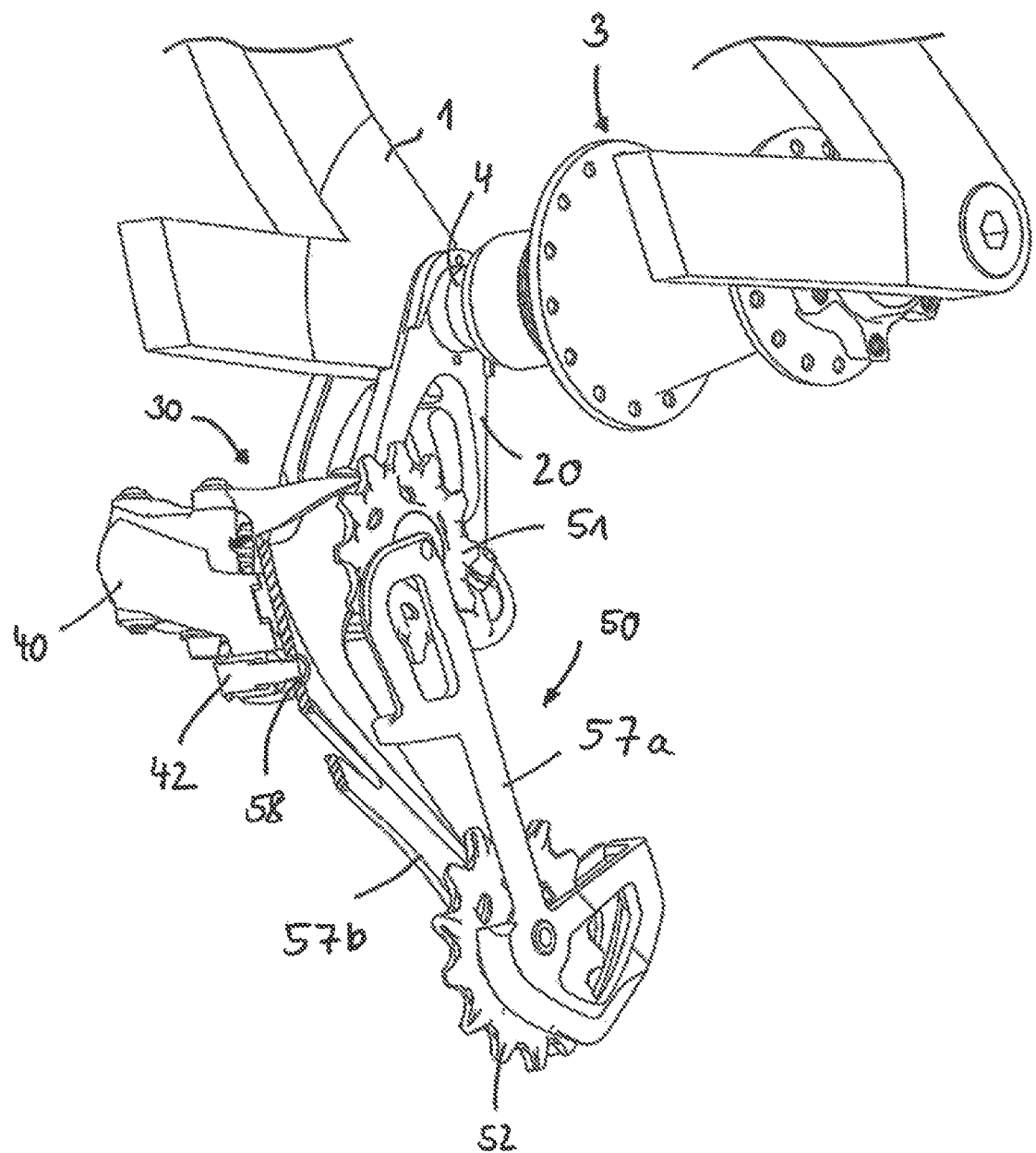
FIG. 10 shows a partial section through a second embodiment with setting aid.

FIG. 10 shows a partial section through the second embodiment of the gearshift mechanism 10 according to the invention with a setting aid. The section runs through the movable element 40 and the chain guide arrangement 50. The setting aid is in the form of the arresting element 42 which engages into the arresting opening 58 in the outer cage half 57b. By means of the setting aid, the chain guide arrangement 50, which is preloaded clockwise, is fixed in a predetermined rotational position relative to the movable element 40. The predetermined rotational or angular position fixes the upper chain guide roller 51 with an ideal spacing to a reference pinion of the pinion assembly (not shown here). For the setting of the gearshift mechanism 10, the latter is arrested by means of the setting aid. After the setting has been performed, the arresting action is released, such that the chain guide arrangement 50 can rotate relative to the movable element 40.

The installation steps and the setting of the gearshift mechanism 10 according to the invention will be described below with reference to FIGS. 1 to 10.

i) The gearshift mechanism 10 is pre-installed on the frame 1 by means of the base element 20 and the adapter 60. For this purpose, the base element 20 engages around the right-hand dropout of the frame 1, and the adapter 60 is inserted and screwed into the frame opening 2b and the centring openings 23a, 23b in the base element 20. The adapter 60 is screwed in to such an extent that it is held together with the base element 20, so as to still be rotatable, on the frame 1 (cf. FIGS. 6 and 7). After the first installation step, the adapter 60 and the base element 20 have been pre-positioned relative to the frame 1 in an axial and radial direction but have not yet been tightened. The adapter 60 and base element 20 are rotatable relative to the frame 1 about the axis A.

ii) The rear wheel with the entire hub arrangement is inserted, and the plug-in axle 7 is screwed in but is not yet fully tightened (cf. FIGS. 1 to 3, without an illustration of the rear wheel). In the not yet fully tightened state, the gearshift mechanism 10 can still rotate about the rear-wheel axle A.

iii) The adapter 60 is tightened. Here, the bolt 61 is rotated with the nut 66 clockwise relative to the base element 20 until the stops 68a, 68b of the nut 66 strike the counterpart stops 24a, 24b of the base element 20. Owing to the stops, the base element 20 and the entire gearshift mechanism 10 are, during the further rotation, driven along until the chain is tensioned. In the tensioned position, both the base element 20 and the nut 66 are fixed, such that the bolt 61 is screwed into the internal thread 67 of the nut 66 until the adapter 60 has been tightened against the frame 1. Optionally, a setting aid may be used. A setting arresting means as shown in FIG. 10 would be conceivable. The arresting means 42/58 fixes the chain guide arrangement 50, which is rotatable about the axle P, in a particular angular position and thus predefines the desired spacing between the upper chain roller 51 and a reference pinion. For this purpose, the gearshift mechanism 10 is shifted into a reference gear ratio or onto a reference pinion, the chain guide 50 is arrested, and the base element 20 together with the entire gearshift mechanism 10 is rotated rearwards about the rear-wheel axle A until the ideal chain tension is reached.

iv) In the set position, the plug-in axle 7 is tightened, and the arresting action is released. As a result of the tightening of the plug-in axle 7, the inner arm 22a is clamped between the hub end cap 4 and the adapter 60. As a result, the arm 22a, together with the entire base element 20 and the gearshift mechanism 10, is oriented orthogonally with respect to the hub end cap 4 or the rear-wheel axle A. Any frame tolerances no longer play a role with regard to this orientation. This simple setting is possibly only owing to the coaxial installation of the gearshift mechanism 10 with the rotary axle A and the resulting unchanging spacing between a reference pinion and the arrested upper chain roller 51. In the case of a non-coaxially installed gearshift mechanism RD, the spacing between the upper chain roller and a reference pinion would change in the event of a rotation about the B-axle, which is spaced apart from the rear-wheel axle A, of the base element (cf. FIG. 13).

When the plug-in axle 7 has been tightened, the base element 20 is also rotationally fixed relative to the frame 1. Only the pivot mechanism 30, the movable element 40 and the chain guide arrangement 50 of the gearshift mechanism 10 still move relative to the frame 1 during the gearshift. During the uninstallation process, the plug-in axle 7 is loosened, such that the gearshift mechanism 10 can rotate rearwards again and the rear wheel can be removed.

Figure 11:
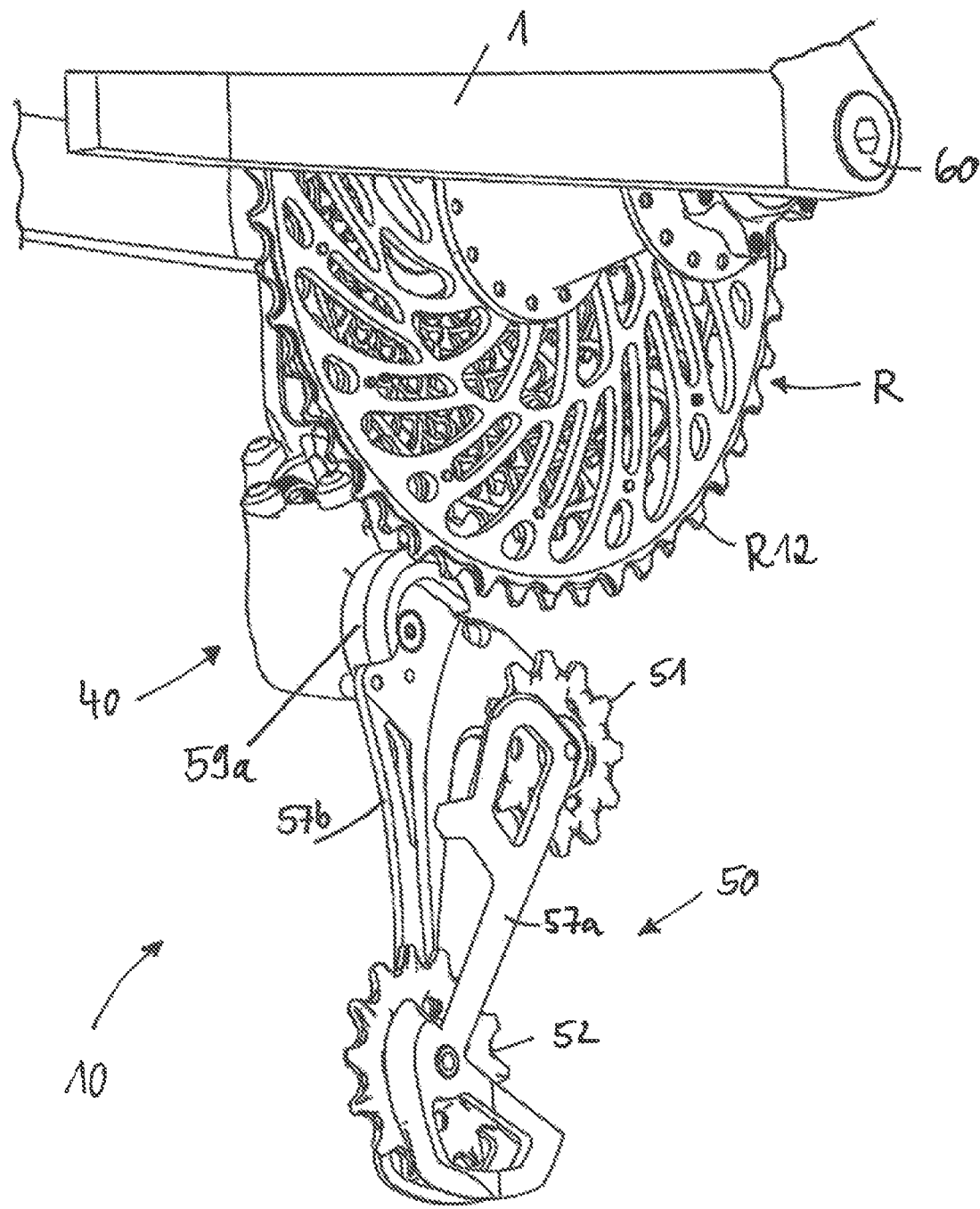
FIG. 11 shows a view from the inside of a third embodiment in the inner stop position.
Figure 12:
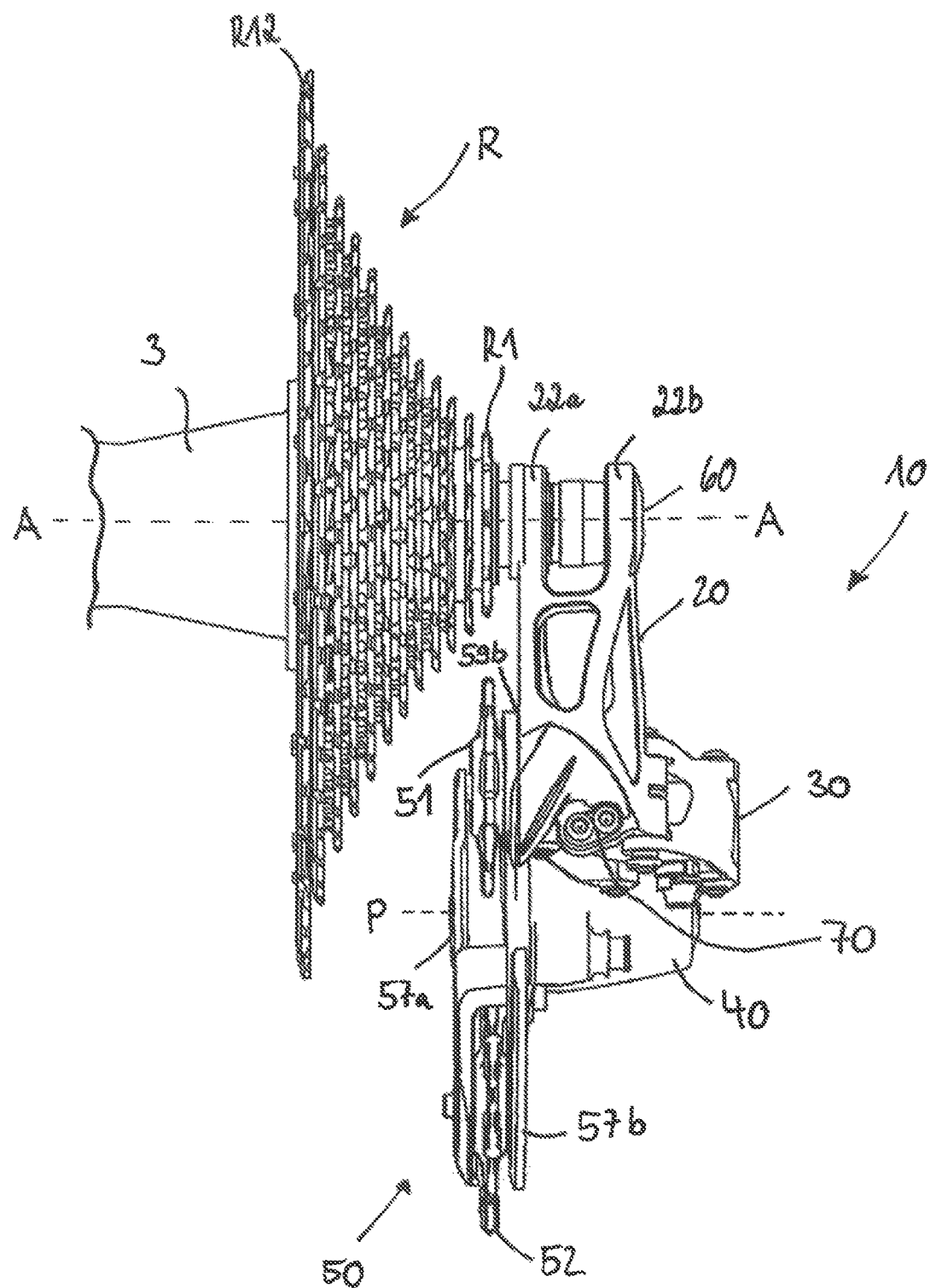
FIG. 12 shows a view from the rear of the third embodiment in the outer stop position.

FIGS. 11 and 12 show third exemplary embodiments of the gearshift mechanism 10 according to the invention with delimiting surfaces 59a and 59b, which make it possible to omit the conventional limit screws 70. For illustrative purposes, the limit screws 70 are still illustrated in FIG. 12.

In FIG. 11, the gearshift mechanism 10 is aligned with the largest pinion R12 of the pinion assembly R. This position represents the inner maximum position. It is the intention that the gearshift mechanism 10 moves inwards no further in an axial direction. For this purpose, the first limit stop 59a is arranged on the chain guide arrangement 50, in particular on the inner side of the outer cage half 57b. The first limit stop 59a is designed so as to interact with the largest pinion R12. For this purpose, the inner limit stop 59a projects beyond the cage 57b in the region of the P-axle and, in the inner maximum position, abuts against the outer side of the pinion R12. The chain guide arrangement 50 can then be moved no further inwards in an axial direction relative to the largest pinion R12.

In other words, in the inner maximum position of the gearshift mechanism 10, the outer cage half 57b of the chain guide arrangement 50 extends in a radial direction into a region of the largest pinion R12 which is situated within the radial external diameter of the largest pinion R12. In the inner maximum position of the gearshift mechanism 10, the outer cage half 57b extends in the axial direction between the largest pinion R12 and the next-smaller pinion R11 adjacent thereto. In the inner maximum position of the gearshift mechanism 10, a chain (not shown here) is in engagement with the largest pinion R12. If the gearshift mechanism 10 is moved further inwards in an axial direction beyond the inner maximum position, the outer cage half 57b or the inner limit stop 59a abuts against the largest pinion R12 and thus limits the movement of the gearshift mechanism 10. The inner limit stop 59a is in this case formed in one piece with the outer cage half 57b. Multi-part embodiments of cage and limit stop are likewise conceivable.

Alternatively, instead of the cage arrangement, the movable element (P-knuckle) may also be designed so as to act as an inner limit stop in the intended inner maximum position of the gearshift mechanism. The inner limit stop interacts with the pinion assembly, in particular with a pinion or with some other suitable element assigned to the pinion assembly, for example a chain guard disk.

In FIG. 12, the gearshift mechanism 10 is aligned with the smallest pinion R1 of the pinion assembly R. In relation to FIG. 11, the chain guide arrangement 50 has been rotated much further rearwards (clockwise). The upper chain guiding roller 51 is approximately as far remote in a radial direction from the pinion R1 as it is from the pinion R12 in FIG. 12. The position shown represents the outer maximum position of the gearshift mechanism 10. It is the intention that the gearshift mechanism 10 moves no further outwards in an axial direction. For this purpose, the second limit stop 59b is arranged on the chain guide arrangement 50, in particular on the outer side of the outer cage half 57b. The second limit stop 59a is designed so as to interact with the base element 20. More specifically, the outer side of the outer cage half 57b in the region of the upper chain guiding roller 51 acts as second limit stop 59b. In the outer maximum position, the second limit stop 59b abuts against the inner side of the base element 20. The inner side of the base element 20 is at the same time the inner side of the first arm 22a. The chain guide arrangement 50 can then be moved no further outwards in an axial direction relative to the base element 20.

An advantage of the limit stops 59a, 59b is that these fixed stops no longer have to be set, but are rather already coordinated with the pinion assembly R. The limit screws 70 for setting the stops are no longer necessary.

Figure 14:
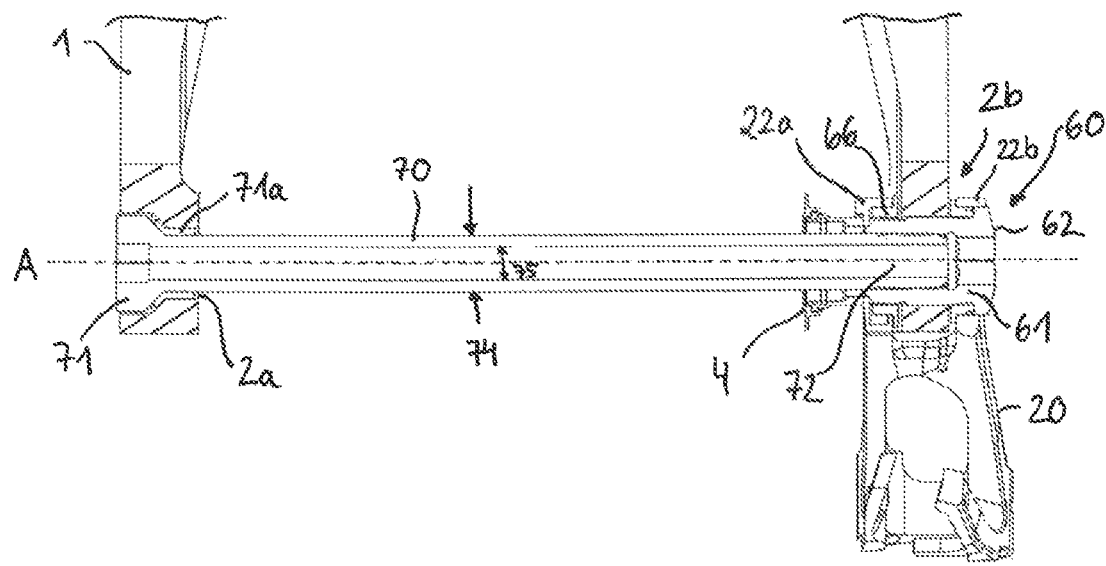
FIG. 14 shows a sectional illustration of a fourth embodiment.

Specifically in conjunction with the pinion assembly R illustrated in FIGS. 11 and 12, which has a large number of twelve pinions R1-R12 and a large spread of in this case ten teeth on the smallest pinion R1 and 50 teeth on the largest pinion R12, the advantages of the gearshift mechanism 10 according to the invention are particularly great. FIG. 14 shows a sectional illustration of a fourth exemplary embodiment along the axis A in a view from the rear. For the sake of a better overview, said illustration shows only the frame 1, the plug-in axle 70, the right-hand hub end cap 4 and selected parts of the gearshift mechanism. All of the parts shown are illustrated in section.

The base element 20 is fastened by means of the adapter 60 to the right-hand dropout. For this purpose, the bolt 61 extends through the right-hand frame opening 2b and is screwed to the nut 66. The plug-in axle 70 is inserted with its first end 71 into the left-hand frame opening 2a and is screwed with its second end 72 into the bolt 61 of the adapter 60. The adapter 60 or the bolt 61 simultaneously serves as a counterbearing for the plug-in axle 70. When the plug-in axle 70 is tightened, it is screwed further into the bolt 61 and clamps the latter against the frame 1. The external diameter 74 of the plug-in axle 70 is dimensioned to be smaller than the frame opening 2a. The intermediate space is compensated by means of a bushing 71a. The first plug-in axle end 71 has a head with a diameter larger than the frame opening 2a, and cannot slip through the frame opening 2a. The head diameter decreases in a continuous manner from the first end 71 towards the body or shank of the plug-in axle 70, as far as the external diameter 74. The transition runs at a 45 degree angle. Other angular dimensions, in particular 90 degrees, are likewise conceivable. As in the preceding exemplary embodiments, the inner arm 22a of the base element 20 is fixed in an axial direction between the right-hand hub end cap 4 and the bolt 61. Furthermore, the inner arm 22a of the base element 20 is centred in a radial direction on the centring region of the bolt 61 (cf. details in FIGS. 7 and 8) and the outer arm 22b is centred on the bolt head 62. The plug-in axle 70 that is shown has an external diameter 74 of 12 mm and an internal diameter 75 of 7 mm. This yields a plug-in axle wall thickness of 2.5 mm. The exemplary embodiment of the plug-in axle 70 in FIG. 14 corresponds substantially to the preceding figures, but is in this case illustrated once again directly alongside a plug-in axle 80 as per FIG. 15a with an enlarged external diameter 84 and a different centring arrangement.

Figure 15A:
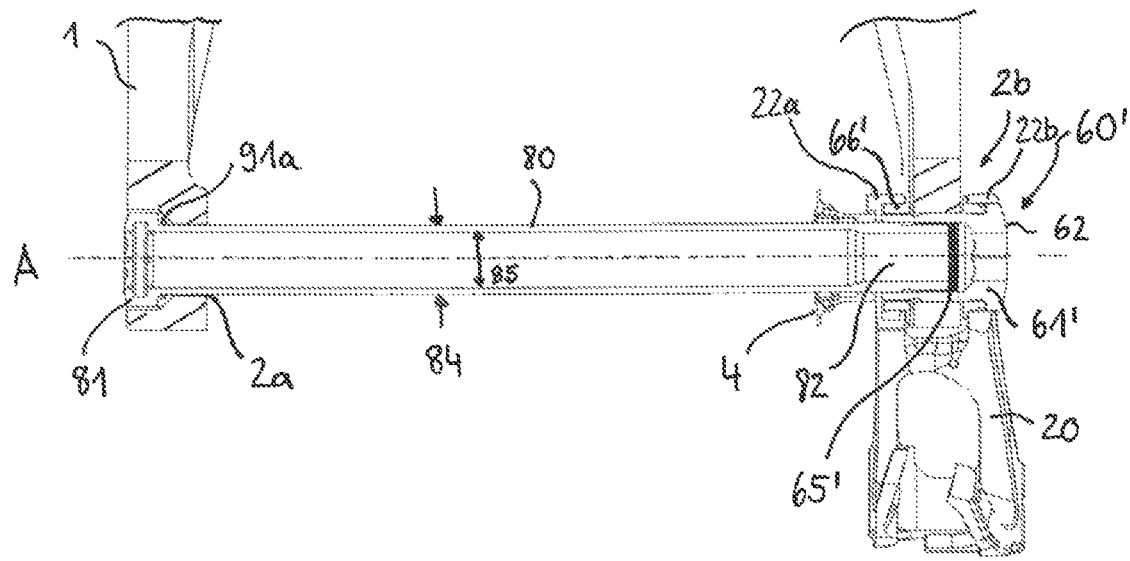
FIG. 15a shows a sectional illustration of a fifth embodiment.

FIG. 15a shows a sectional illustration of a fifth exemplary embodiment, which differs from the preceding embodiment in several aspects owing to the plug-in axle 80 with an enlarged external diameter 84. The plug-in axle 80 that is shown has an external diameter 84 of 15 mm and a first internal diameter 85 of 12 mm. This leads to a first wall thickness W85 of 1.5 mm. All of the parts shown are illustrated in section.

The frame 1 with its frame openings 2a and 2b, the hub arrangement (shown only in part here) with the hub end cap 4, and the base element 20 of the gearshift mechanism, are unchanged. Only the adapter 60' has to be adapted to the enlarged external diameter 84 of the plug-in axle 80. To be able to receive the plug-in axle 80, the diameter of the internal threads 65' of the bolt 61' is adapted to the external diameter 84 thereof. Furthermore, the centring region (cf. centring region 63c of the preceding embodiments) on the bolt 61' is omitted. This has the result that the base element 20 makes direct contact with the outer circumferential surface of the plug-in axle 80. This means that the inner arm 22a of the base element 20 is centred directly on the plug-in axle 80, and not, as in the preceding examples, on the adapter 60. The outer arm 22b of the base element is centred, in an unchanged manner, on the outer circumference of the bolt head 62'. The referencing of the base element 20 in an axial direction and in a radial direction is now independent of the frame 1. In an axial direction, the base element 20 is fixed between the hub end cap 4 and the adapter 60', in particular the stop surface 63d' of the bolt 61' (see FIG. 19). In a radial direction, the inner arm 22a of the base element 20 is centred directly on the plug-in axle 80, and the outer arm 22b is centred on the adapter 60', in particular on the bolt head 62'. The substantial independence of frame tolerances permits a precise orientation of the gearshift mechanism even if the two frame openings 2a and 2b are not exactly in alignment. The transition between the head on the first end 81 of the plug-in axle 80 and the plug-in axle body with the external diameter 84 is in this case right-angled. The external diameter 84 of the plug-in axle 80 corresponds approximately to the frame opening 2a. The plug-in axle 80 is led with a small amount of play through the opening 2a. The bushing 91a has a 45 degree angle and serves for the centring of the plug-in axle 80 in the frame opening 2a. Said bushing could also be formed with a different angle.

Figure 15B:
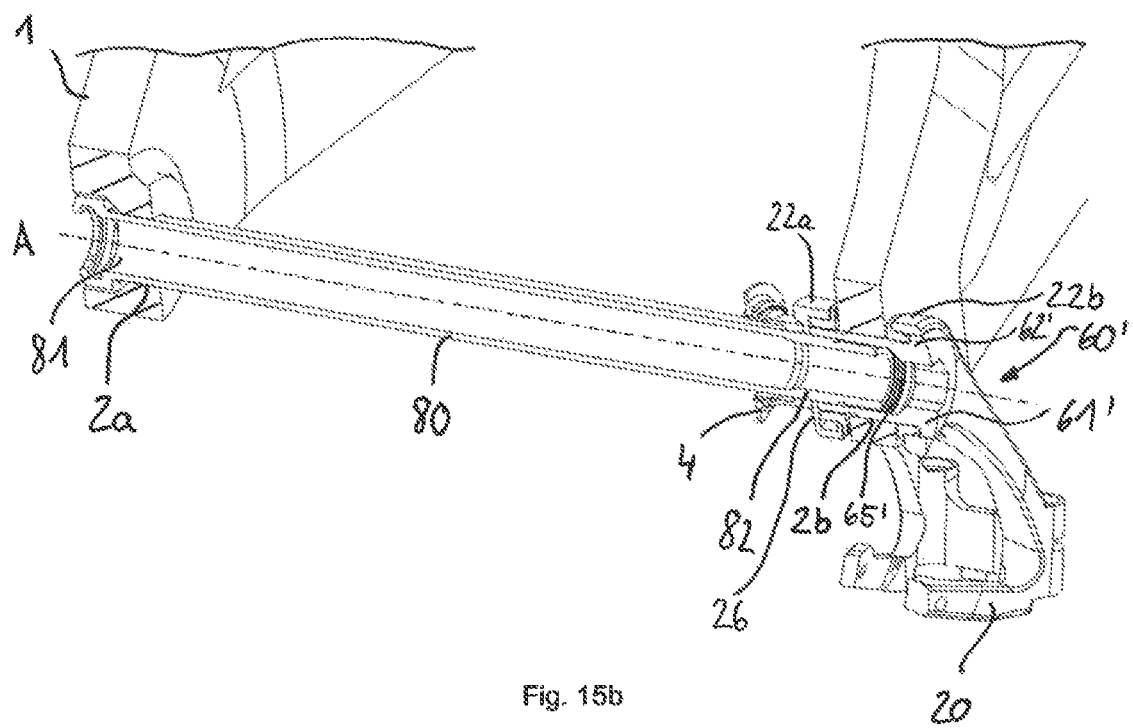

For illustrative purposes, FIG. 15b shows a perspective view from the outside of the sectional illustration from FIG. 15a. The hub end cap 4 bears axially against the hub stop surface 26 of the base element 20.

Figure 16:
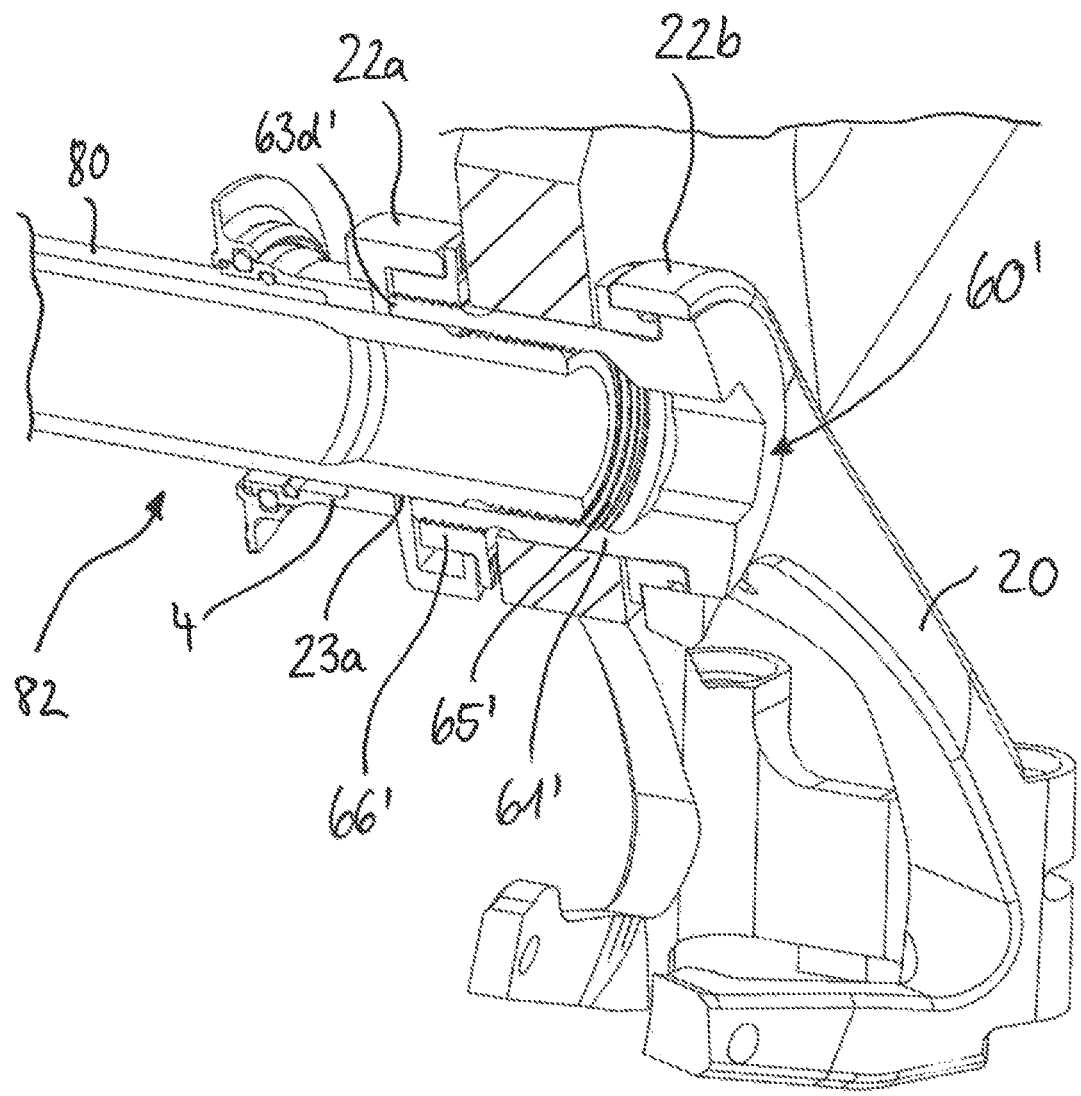
FIG. 16 shows an enlarged detail view from FIG. 15b.

FIG. 16 illustrates an enlarged detail view of the right-hand dropout of the frame 1 from FIG. 15b. The second end 82 of the plug-in axle 80 has been screwed into the internal threads 65' of the bolt 61' of the adapter 60'. Here, the direct contact between the base element 20 and the plug-in axle 80 is particularly clear. The inner arm 22a of the base element 20 bears with its first centring opening 23a in a radial direction directly against the outer circumference of the plug-in axle 80. In an axial direction, the inner arm 22a is fixed between the hub end cap 4 and the stop surface 63d' of the bolt 61'. The nut 66' corresponds substantially to the preceding embodiments.

Figure 17:
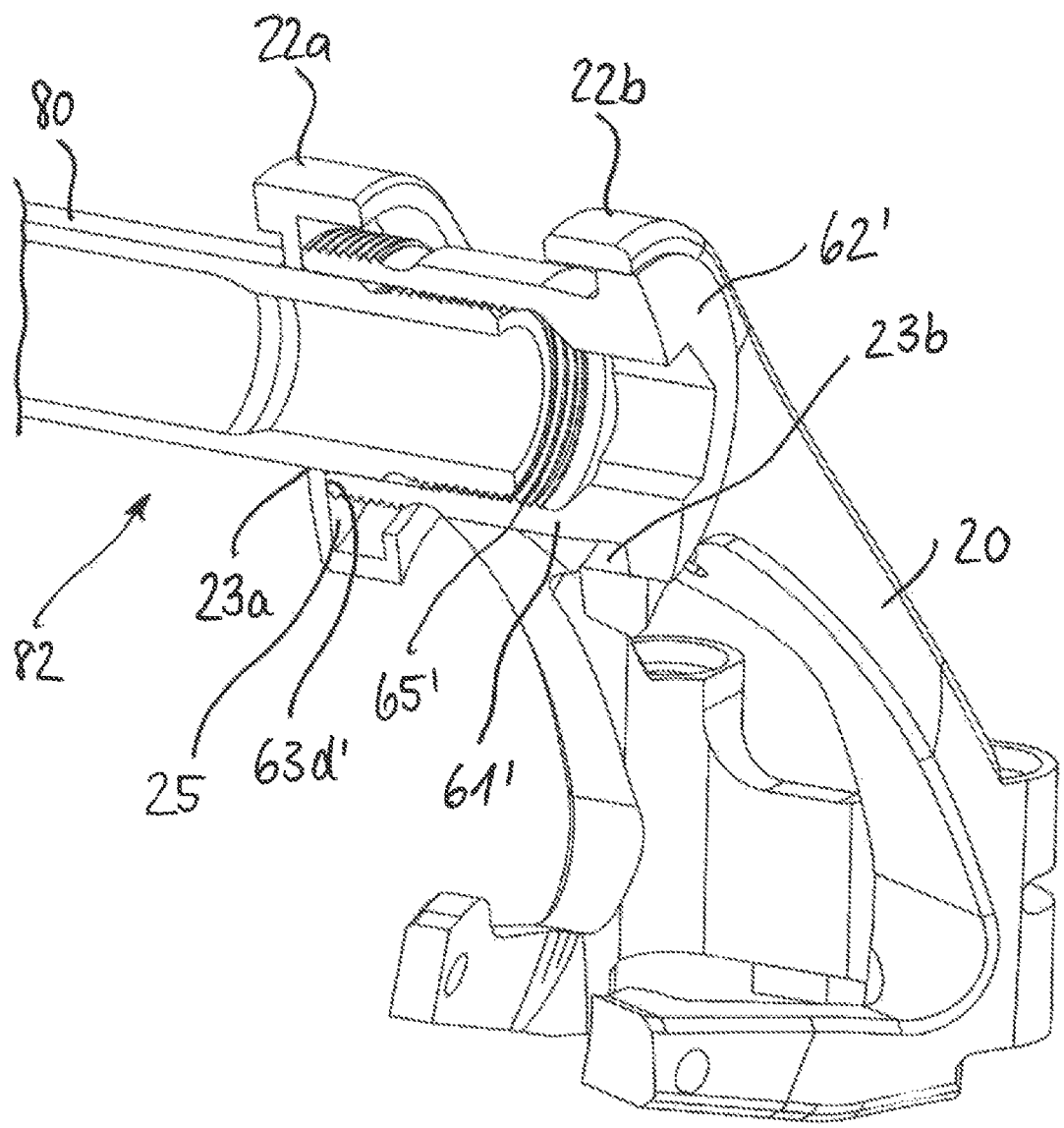
FIG. 17 shows selected parts from FIG. 16.

FIG. 17 corresponds to the view from FIG. 16, wherein, for better clarity, the hub end cap and the adapter nut have been omitted. The bolt 61' abuts with its stop surface 63d' in an axial direction against a counterpart stop surface 25 of the inner arm 22a. The outer arm 22b of the base element 20 is, in an unchanged manner, centred with its second centring opening 23b on the outer circumference of the bolt head 62'.

Figure 18:
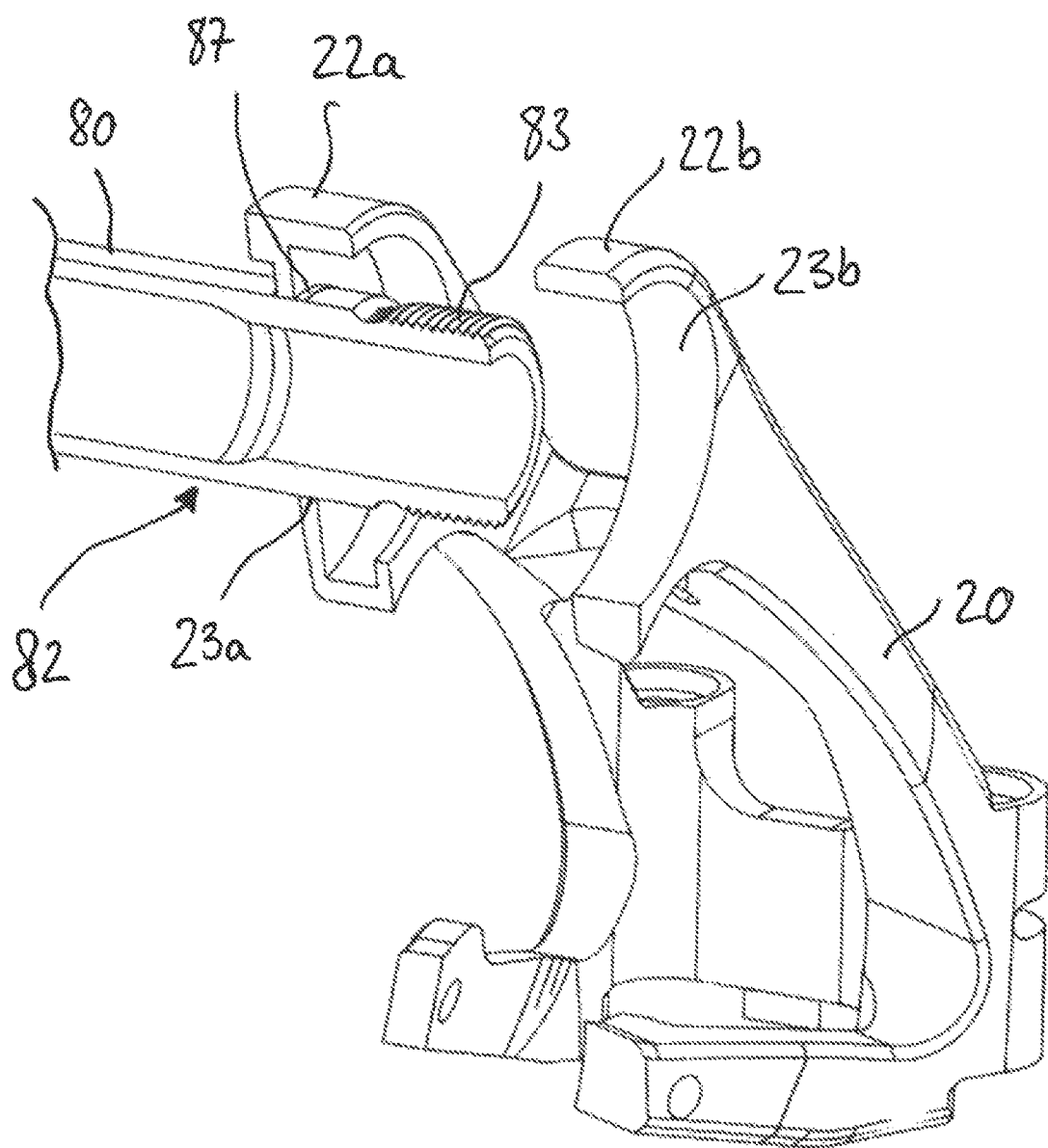
FIG. 18 shows selected parts from FIG. 16.

FIG. 18 shows the arrangement from FIG. 17 without the bolt. Here, the centring of the base element 20 on the plug-in axle 80 is particularly clear. The second end 82 of the plug-in axle 20 extends through the inner arm 22a of the base element 20. The external thread 83 of the plug-in axle 80 is situated, in the installed state, between the first and the second arm 22a, 22b of the base element 20. To realize the most precise possible centring of the base element 20 on the plug-in axle 80, the surface 87 of the plug-in axle 80 is machined at least in the contact region between base element 20 and plug-in axle 80. Said centring surface 87 is for example finely turned, ground and/or coated. Owing to the cumbersome machining, the centring surface 87 is kept as small as possible. The centring surface 87 must however be at least as wide as the first centring opening 23a of the first arm 22a of the base element 20.

In particular, in the installed state, the centring surface 87 of the plug-in axle 80 extends at least into the region of the bolt 61', such that the bolt foot comes to lie on the centring surface 87. This embodiment permits exact centring of the bolt 61' on the plug-in axle 80. The centring as a result of the external thread 83 of the plug-in axle 80 being screwed into the internal thread 65' of the bolt 61' is, on its own, not sufficiently precise owing to the thread play. The centring surface 87 removes the play between bolt 61' and plug-in axle 80. A particularly rigid connection between the plug-in axle 80 and the bolt 61' is thus possible. The centring surface 87 should have a minimum width in order that tolerances can, depending on screwing-in depth, be compensated in a manner dependent on the hub arrangement and frame width and the base element 20 always comes to lie on the surface 87. An axial width of the centring surface 87 of approximately 2.5 mm (or more) is sufficiently wide and can be manufactured relatively quickly and inexpensively.

It would be possible for a further centring surface to be formed on the outermost second end of the plug-in axle, which further centring surface likewise interacts with the bolt and leads to an even stiffer connection. It would also be possible for the entire outer surface of particularly high-grade plug-in axles to be finish-machined.

Figure 19:
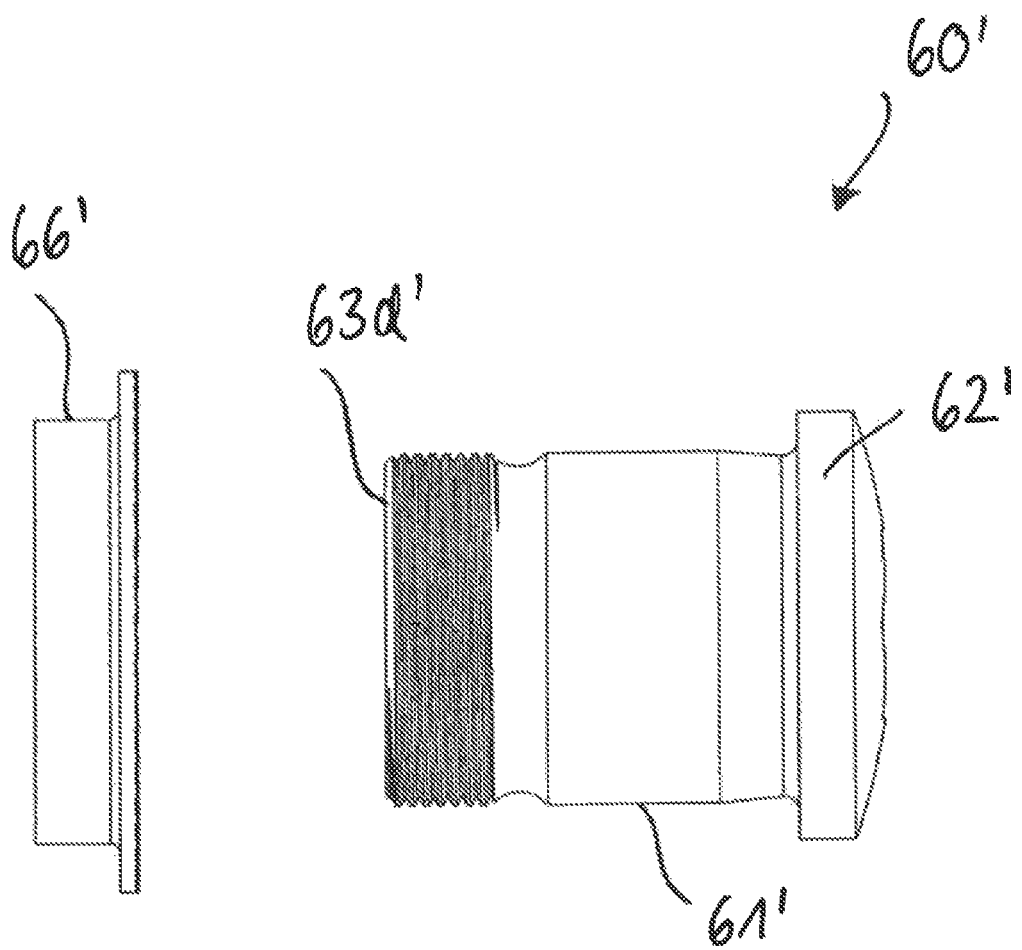
FIG. 19 shows an enlarged exploded illustration of the adapter of the fifth embodiment.

FIG. 19 shows an enlarged exploded illustration, in a non-sectional rear view, of the adapter 60' composed of the bolt 61' and the nut 66'. The adapter 60' substantially corresponds to the adapter 60 of the preceding exemplary embodiment in FIGS. 1 to 12, for which reason only the differences will be discussed here. The internal thread of enlarged diameter and adapted to the 15 mm plug-in axle 80 is not visible in the rear view. The stop 63d' forms the inner axial end of the bolt 61'. The other outer dimensions of the bolt 61' are unchanged and are coordinated with the base element 20.

Figure 20A:
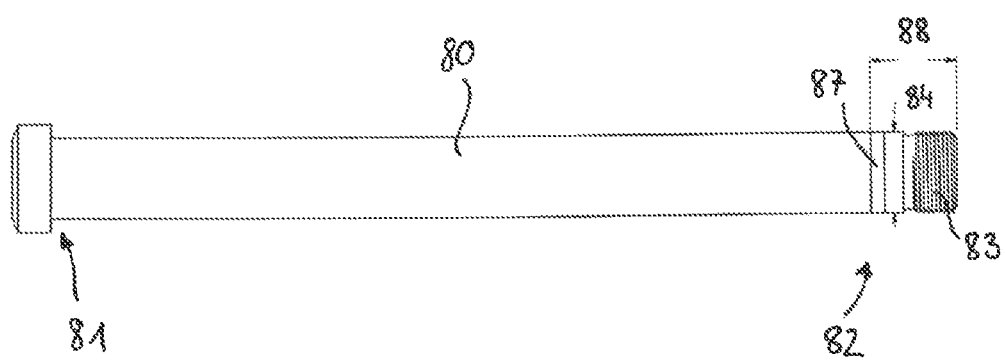
FIG. 20a shows a thru axle as per the fifth embodiment.
Figure 20B:
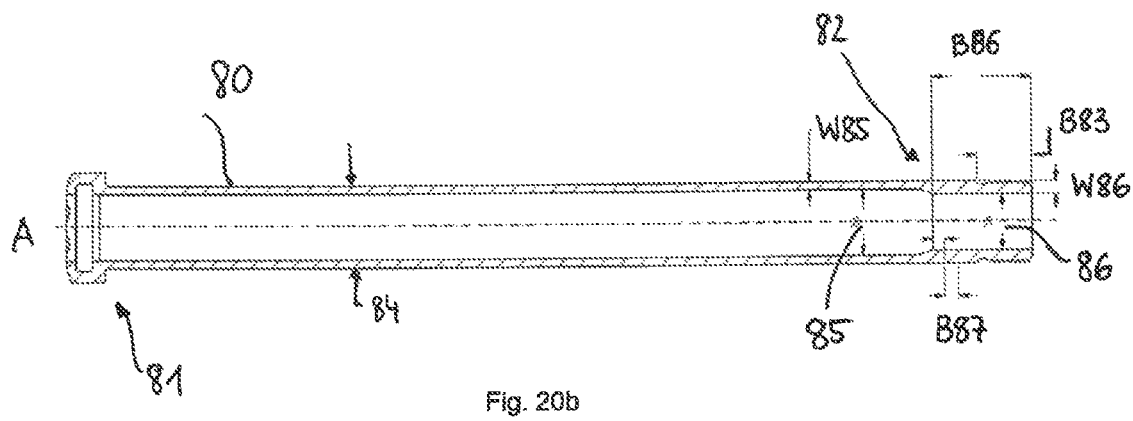

A plug-in axle 80 as per the fifth exemplary embodiment is shown in a non-sectional rear view in FIG. 20*a* and in a sectional view along the axis A in FIG. 20*b*. The plug-in axle 80 has an external diameter 84 of 15 mm. The entire axial width from the first end 81 to the second end 82 varies according to the hub standard used and the frame conditions. Typical hub widths from the left-hand to the right-hand hub end cap are 142 to 148 mm. The external thread 83 and the centring surface 87 are arranged in the region of the second plug-in axle end 82. The centring surface 87 is situated axially further to the inside than the external thread 83. The centring surface 87 begins with a spacing 88 of approximately 13.5 mm and ends with a spacing 88 of approximately 16 mm to the second plug-in axle end 82. The centring surface 87 has an axial width B87 of approximately 2.5 mm. The axial width B83 of the external thread 83 is approximately 10 mm.

The plug-in axle 80 has an external diameter 84 of 15 mm. Only the first end 81 has an enlarged head diameter. A first internal diameter 85 of the plug-in axle 80 is 12 mm. This yields a first wall thickness W85 of approximately 1.5 mm. The first wall thickness W85 extends over a major part of the axial width of the plug-in axle 80. In the region of the second plug-in axle end 82, said plug-in axle has a second internal diameter 86, which amounts to approximately 10 mm. The second internal diameter 86 is smaller than the first internal diameter 85. The second internal diameter 86 yields a second wall thickness W86, which is greater than the first wall thickness W85. In the exemplary embodiment shown, the second wall thickness W86 is dimensioned to be approximately 2.4 mm. The second internal diameter 86 or the enlarged second wall thickness W86 is arranged specifically in those regions of the plug-in axle 80 which are subjected to high load, in particular in the region of the external thread 83. The region of the centring surface 87 also has an enlarged wall thickness W86, because it is here that the base element 20 lies on the plug-in axle 80 and correspondingly relatively high forces act. The transition between the first and the second internal diameter W85, to W86 is continuous. The second internal diameter 86 extends from the outermost second plug-in axle end 82 over a width B86 of approximately 18 mm in an axial direction.

From the first end 81 to the second end 82 of the plug-in axle 80, there are three regions arranged in succession: first end 81 with enlarged head diameter, right-angled transition to the external diameter 84, first internal diameter 85 with the resulting wall thickness W85, transition from the first internal diameter 85 to the second internal diameter 86 with the resulting wall thickness W86, centring surface 87, external thread 86 and second plug-in axle end 82.

Figure 21:
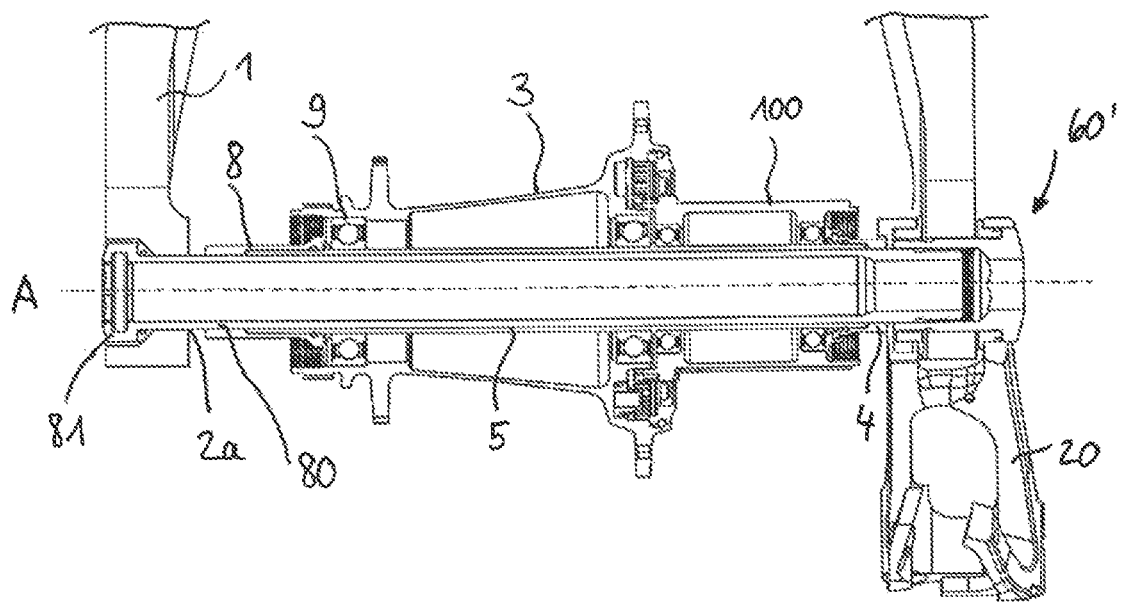
FIG. 21 shows a sectional illustration of the entire rear-wheel axle arrangement with thru axle as per the fifth embodiment.

FIG. 21 shows a sectional illustration of a rear-wheel axle arrangement with a plug-in axle 80 as per the fifth exemplary embodiment. All of the parts are illustrated in section. The plug-in axle 80 extends in the installed state through the frame opening 2*a*, the hub arrangement and the driver 100, and is screwed into the gear shift mechanism, in particular the adapter 60'. The gearshift mechanism (only partially shown here) is fastened to the right-hand dropout of the frame 1 by means of the base element 20 and the adapter 60'. The hub arrangement is fastened to the frame 1 by means of the plug-in axle 80. As a result of the plug-in axle 80 being screwed into the thread of the adapter 60', the base element 20 is clamped in an axial direction against the hub arrangement, in particular the right-hand hub end cap 4. If the plug-in axle 80 is removed, the gearshift mechanism together with adapter 60' and base element 20 remains on the frame 1. The hub arrangement comprises inter alia the left-hand hub end cap 8, the hub bearing arrangement 9, the hub sleeve 3, the hub axle 5 and the right-hand hub end cap 4.

Figure 22:
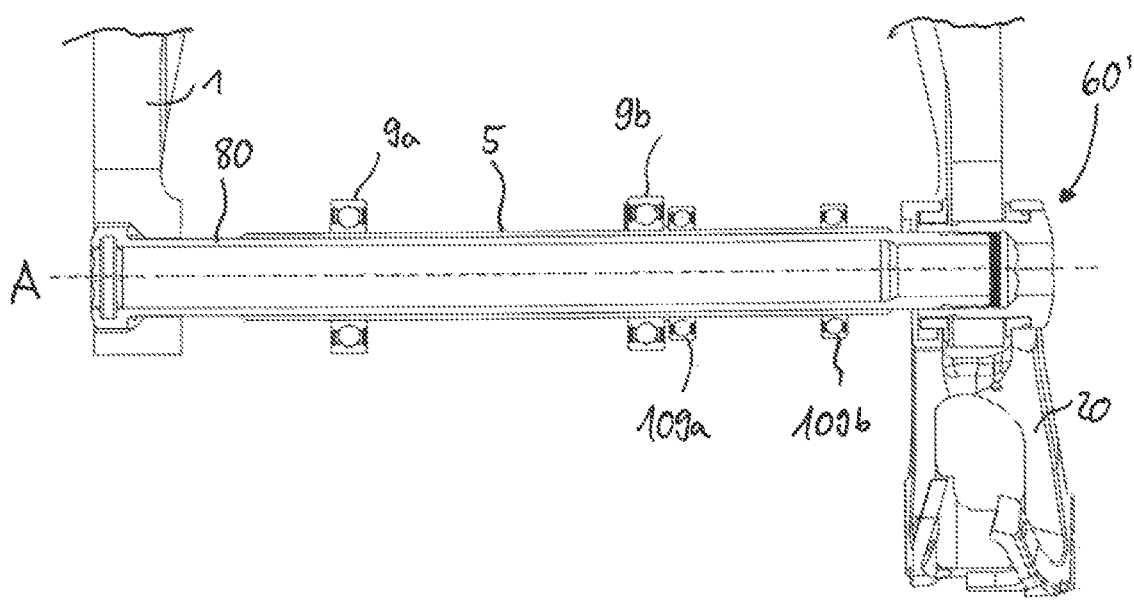
FIG. 22 shows a sectional illustration of selected parts of the rear-wheel axle arrangement from FIG. 21.

FIG. 22 shows selected parts of the rear-wheel axle arrangement from FIG. 21. For better clarity, the driver and most parts of the hub arrangement have been removed here. Only the hub axle 5 and the hub bearing arrangement 9, composed of the hub bearings 9*a*, 9*b*, formed as rolling bearings, of the hub arrangement, are illustrated. The plug-in axle 80 has been inserted with a small amount of play into the hub axle 5. The hub bearings 9*a*, 9*b* and the driver bearings 109*a*, 109*b* have been mounted onto the hub axle 5. All parts are illustrated in section.

Figure 23:
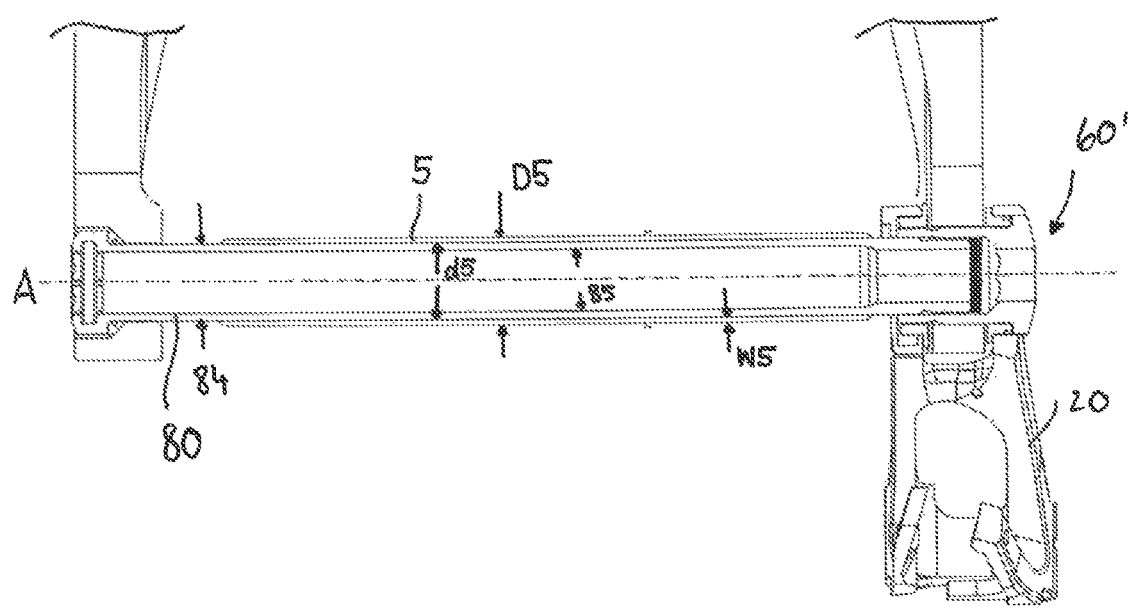
FIG. 23 shows a sectional illustration of selected parts from FIG. 22.

FIG. 23 shows the sectional illustration of the rear-wheel axle arrangement from FIG. 22 without the bearings. The plug-in axle 80 with an external diameter 84 of 15 mm has been inserted with little play into the hub axle 5. The internal diameter d5 of the hub axle 5 is slightly greater than 15 mm. The external diameter D5 of the hub axle 5 is approximately 17 mm. This yields a wall thickness W5 of the hub axle 5 of approximately 1 mm. The wall thickness W85 of the plug-in axle 80 is greater than the wall thickness W5 of the hub axle 5. In particular, the wall thickness W85 of the plug-in axle 80 is approximately 1.5 mm, and thus 1.5 times that of the hub axle 5. This leads to a relatively balanced ratio of the geometrical moments of inertia.

Figure 24A:
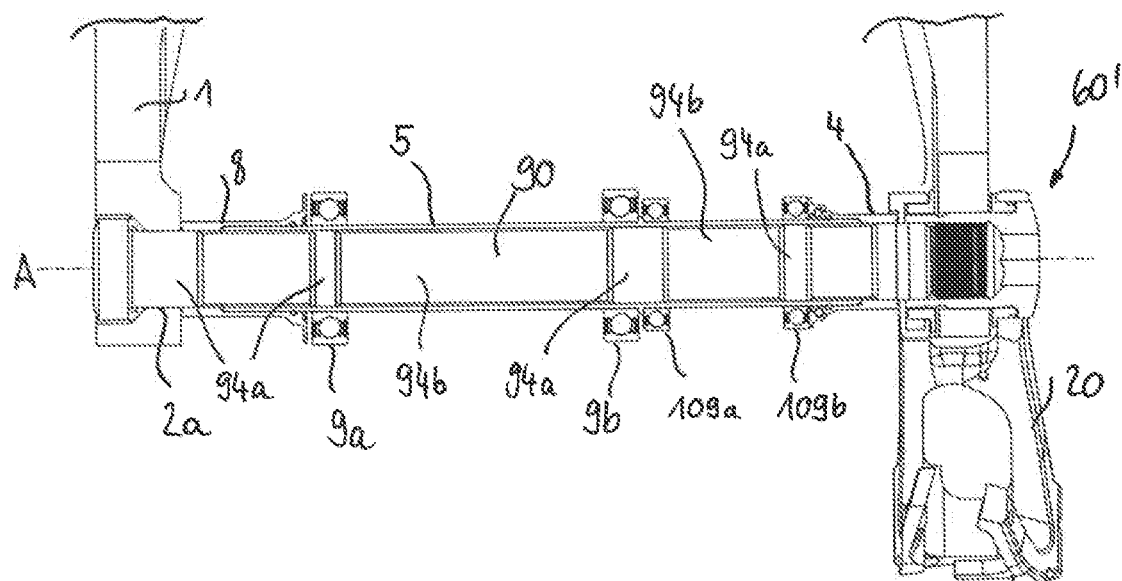
FIG. 24a shows a partially sectional illustration of selected parts of a rear-wheel axle arrangement with a thru axle as per a sixth embodiment.
Figure 24B:
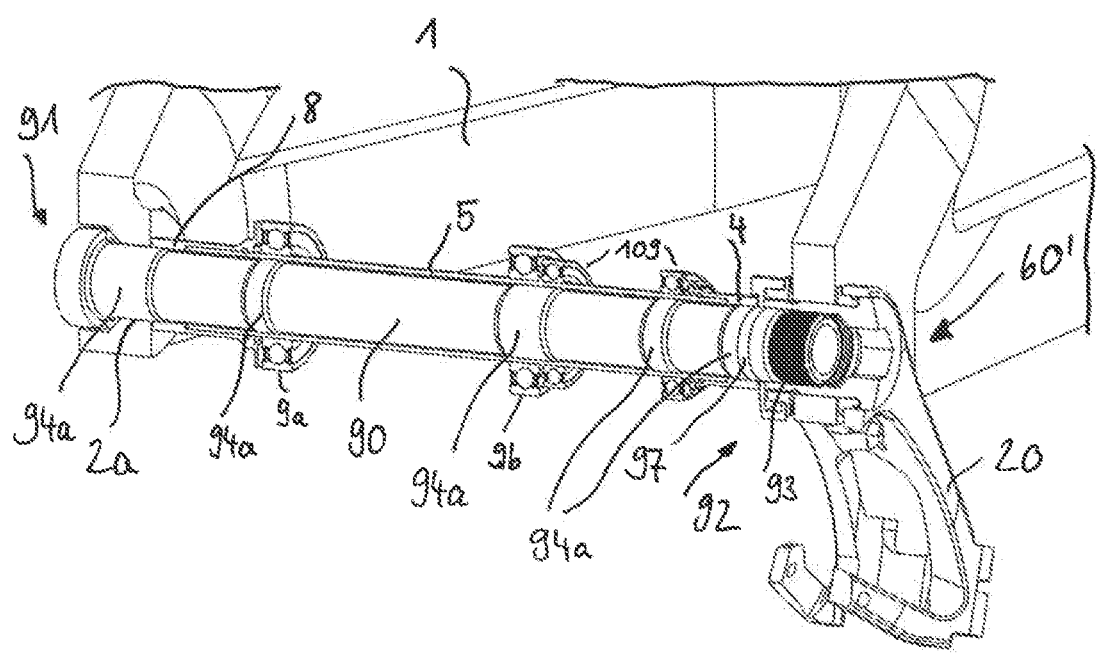

FIG. 24*a* shows a partial section through selected parts of a rear-wheel axle arrangement with a plug-in axle 90 as per the sixth exemplary embodiment. With the exception of the plug-in axle 90, all parts are illustrated in section. FIG. 24*b* shows the partial section from FIG. 24*a* in a perspective view from the outside. The plug-in axle 90 extends through the left-hand frame opening 2*a*, the hub end caps 8, 4 and the hub axle 5 with a small amount of play. The second plug-in axle end 92 has been screwed with the external thread 93 into the adapter 60' of the gearshift mechanism. The first external diameter 94*a* of the plug-in axle 90 is slightly smaller than the internal diameter of the hub axle 5. The plug-in axle 90 has the first external diameter 94*a* in the regions of increased load. These are in particular the plug-in axle ends 91, 92 and the regions of the bearings 9*a*, 9*b*, 109*a*, 109*b*. The other regions of the plug-in axle 90 have a second, reduced external diameter 94*b*.

Figure 25A:
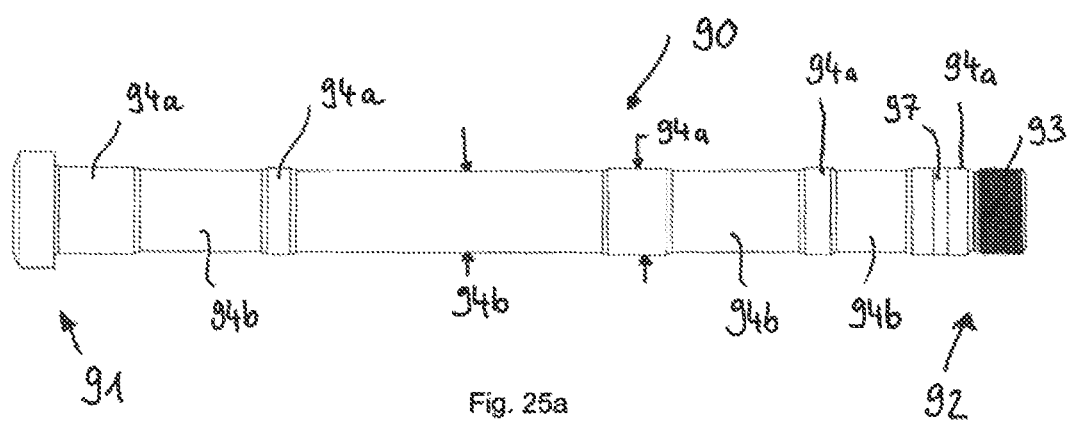
FIG. 25a shows a thru axle as per the sixth embodiment.
Figure 25B:
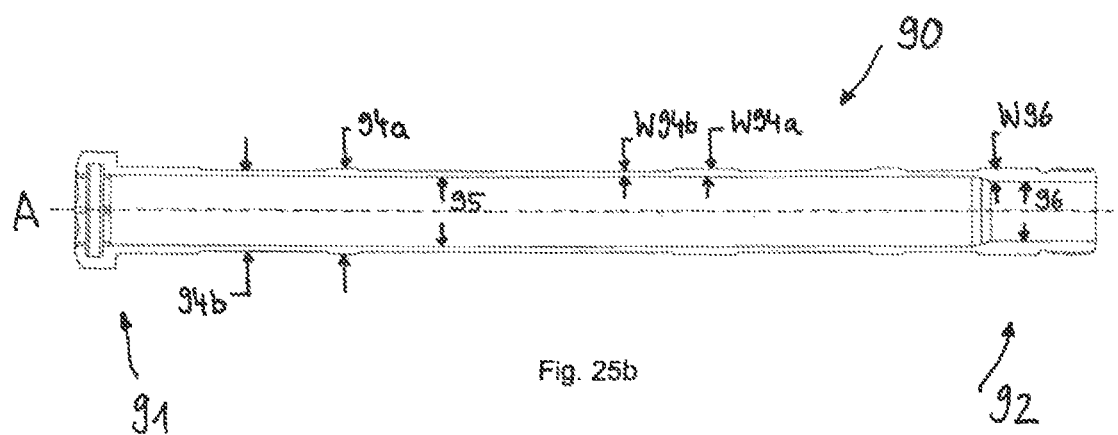

The plug-in axle 90 as per the sixth embodiment is shown in a non-sectional rear view in FIG. 25*a* and in a sectional view along the axis A in FIG. 25*b*.

The plug-in axle 90 differs from the plug-in axle 80 primarily in that, for weight saving purposes, it has a reduced wall thickness W94*b* in large regions. The plug-in axle 90 has a first external diameter 94*a* of 15 mm and a first internal diameter 95 of 12 mm. The first external diameter 94*a* of 15 mm has been reduced to a second external diameter 94*b* of 14 mm. The first internal diameter 95 remains unchanged. This yields a first wall thickness W94*a* of 1.5 mm in the region of the first external diameter 94*a* and a second, reduced wall thickness W94*b* of 1 mm in the region of the reduced external diameter 94*b*. The plug-in axle 90 has the greater external diameter 94*a* and the greater wall thickness W94*b* only in those axial regions which are subjected to relatively high load.

As in the preceding embodiment, the plug-in axle 90 has, in the region of the second end 92, a second, smaller internal diameter 96, which is approximately 10 mm. The second internal diameter 96 yields a third wall thickness W96, which is greater than the first and the second wall thickness W94a, W94b. The second internal diameter 96 and the enlarged second wall thickness W96 are arranged in the highly loaded region of the external thread 93 and of the centring surface 97.

From the first end 91 to the second end 92 of the plug-in axle 90, the following regions are arranged in succession: first end 91 with enlarged head diameter, right-angled transition to the first external diameter 94a, first internal diameter 95 with the resulting wall thickness W94a in the relatively highly loaded regions, the interposed reduced external diameter 94b with the resulting reduced wall thickness W94b, transition from the reduced external diameter 94b to the second internal diameter 96 with the resulting wall thickness W96, centring surface 97, external thread 96 and second plug-in axle end 92.

The reduced external diameter 94b can be produced particularly easily by removing excess material on the outer side of the plug-in axle 90 by turning. Alternatively, a reduced wall thickness could also be realized by means of a third, enlarged internal diameter. Here, material is removed or saved on the inner side of the plug-in axle and not on the outer side. The effect of the weight saving would be the same.

It is basically to be noted that the plug-in axles 80, 90 with an enlarged external diameter of 15 mm have, despite a relatively small wall thickness of 1 mm to 2 mm, a greatly increased geometrical moment of inertia in relation to the plug-in axles 70 with an external diameter of 12 mm. The stiffness is increased and/or the weight is reduced.

In relation to conventional rear-wheel axle arrangements, it is possible with the plug-in axle 80 as per the fifth exemplary embodiment to realize a geometrical moment of inertia of the overall system which is higher by approximately 30%, and at the same time a weight which is lower by approximately 21%.

A further exemplary embodiment which is not shown here, and which could be used specifically for E-bikes, is a plug-in axle with an external diameter of 15 mm and an internal diameter of 11 mm. In relation to conventional rear-wheel axle arrangements for E-bikes with a considerably greater wall thickness, the geometrical moment of inertia is duly reduced slightly, but a considerable amount of weight is saved. Furthermore, the more uniform distribution of the geometrical moment of inertia on the plug-in axle and hub axle leads to an altogether more stable axle arrangement, because the maximum stresses on the outer skin of the hub axle are lower.

A further factor is the distribution of tensile and compressive stresses, which are superposed on the bending stresses. The tensile and compressive stresses are also dependent on the thread lead of the external thread of the plug-in axle. A thread lead of 1 mm axial movement per rotation has proven to be advantageous in the case of a conventional tightening torque. A thread lead of 1.5 mm would be less effective because, for the same tightening torque, a lower tensile stress is built up in the plug-in axle. The tensile stress and the plug-in axle compensates the compressive stress in the hub axle. A high compressive stress on the hub axle is generated because this has a relatively thin wall thickness or a relatively small cross section.

Through the selection of the material, it is possible to further influence both the stiffness and the weight. Preferred materials for the plug-in axle are aluminium, titanium or steel.

The modular system permits a simple and inexpensive change of the plug-in axle 70, 80, 90. Depending on the bicycle type and load, it is possible to select either a stiffer or more lightweight plug-in axle. Only the adapter 60, 60' has to be adapted to the selected plug-in axle 70, 80, 90. The hub arrangement, the driver 100, the base element 20 and the other parts of the gearshift mechanism can be utilized unchanged, and are not influenced by the change of the plug-in axle.

The wall thicknesses of the hub axle and plug-in axle as mentioned in the exemplary embodiments described above are configured for axles manufactured from aluminium. The statements made regarding the geometrical moment of inertia remain valid regardless of the material. As long as the same material is used for the plug-in axle and the hub axle, the stated wall thickness ratios can be maintained.

If different materials are used for the hub axle and the plug-in axle, the wall thicknesses can be adapted according to the maximum stresses. For example, it would be possible for a plug-in axle to be manufactured from titanium and a hub axle to be manufactured from aluminium. It would then be possible for the plug-in axle to be designed with thinner walls in accordance with the admissible yield strengths.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of installing a rear gearshift mechanism on a bicycle, comprising:
   pre-installing the rear gearshift mechanism on a frame of the bicycle by a base member of the rear gearshift mechanism and an adapter, wherein the adapter and the base member are pre-positioned, but not tightened, relative to the frame in an axial and a radial direction, and the adapter and the base member are rotatable relative to the frame about a rear-wheel axis;
   after pre-installation, positioning a rear wheel with a hub arrangement in the frame; and
   after inserting the rear-wheel, partially screwing in a plug-in axle, but not fully tightened, such that the rear gearshift mechanism can still rotate about the rear-wheel axis.

2. The method of claim 1, wherein pre-installing the rear gearshift mechanism includes the base member engaging around a right-hand dropout of the frame, and the adapter being inserted and tightened to a frame opening and at least one centring opening in the base member.

3. The method of claim 2, wherein the adapter is tightened to such an extent that it is held together with the base member and is still rotatable on the frame.

4. The method of claim 1, wherein the adapter includes a bolt and nut, the bolt at least partially rotates with the nut in a clockwise direction relative to the base member until at least one stop of the nut strikes at least one counterpart stop of the base member.

5. The method of claim 4, further comprising:
   inserting a chain;
   after inserting the chain, tightening the adapter; and
   after inserting the chain, tightening the plug-in axle.

6. The method of claim 5, wherein, the rear gearshift mechanism is driven along until the chain is tensioned, and in the tensioned position both the base member and the nut are fixed such that the bolt is screwed into an internal thread of the nut until the adapter has been tightened against the frame.

7. The method of claim 6, wherein a setting aid is used to fix a chain guide, which is rotatable about a rotary axle, in a particular angular position and predefines the desired spacing between an upper chain roller and a reference pinion.

8. The method of claim 7, further comprising:
shifting the rear gearshift mechanism into a reference gear ratio or onto a reference pinion.

9. The method of claim 8, further comprising:
arresting the chain guide using the setting aid.

10. The method of claim 9, after the plug-in axle is tightened, the method further comprising:
releasing the chain guide using the setting aid.

11. The method of claim 4, wherein tightening the plug-in axle causes an inner arm to be clamped between a hub end cap and the adapter, causing the inner arm and the base member to be oriented orthogonally with respect to at least one of the hub end cap or the rear-wheel axle.

12. The method of claim 11, wherein when the plug-in axle has been tightened, the base member is rotationally fixed relative to the frame.

\* \* \* \* \*